United States Patent
Nagahara et al.

(10) Patent No.: US 6,184,884 B1
(45) Date of Patent: *Feb. 6, 2001

(54) IMAGE CONTROLLING DEVICE AND IMAGE CONTROLLING METHOD FOR DISPLAYING A PLURALITY OF MENU ITEMS

(75) Inventors: Junichi Nagahara, Tokyo; Toshikazu Minoshima, Kanagawa; Tomohisa Shiga, Kanagawa; Hajime Ogura, Kanagawa; Mayu Irimajiri, Tokyo, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/190,430

(22) Filed: Nov. 12, 1998

Related U.S. Application Data

(62) Division of application No. 08/723,769, filed on Sep. 30, 1996, now Pat. No. 5,898,435.

(30) Foreign Application Priority Data

| Oct. 2, 1995 | (JP) | ................................................ P07-254975 |
| Oct. 2, 1995 | (JP) | ................................................ P07-254985 |
| Oct. 2, 1995 | (JP) | ................................................ P07-254986 |

(51) Int. Cl.[7] ........................................................ G06F 3/14
(52) U.S. Cl. ........................ 345/352; 345/355; 345/357; 345/339
(58) Field of Search ..................................... 345/333, 334, 345/339, 355, 356, 357, 352, 353, 418, 419, 427

(56) References Cited

U.S. PATENT DOCUMENTS

| 5,245,109 | * | 9/1993 | Nakano et al. ........................ 345/352 |
| 5,295,243 | * | 3/1994 | Robertson et al. ................... 345/348 |
| 5,408,655 |   | 4/1995 | Oren et al. ............................ 395/600 |
| 5,515,486 | * | 5/1996 | Amro et al. .......................... 345/339 |
| 5,592,599 |   | 1/1997 | Lindholm ............................. 395/127 |

OTHER PUBLICATIONS

G. Robertson et al., "Information Visualization Using 3D Interactive Animation," Communications of the Association of Computing Machinery, vol. 36, No. 4, Apr. 1993, pp. 57–71.

(List continued on next page.)

*Primary Examiner*—Raymond J. Bayerl
*Assistant Examiner*—Cao H. Nguyen
(74) *Attorney, Agent, or Firm*—Limbach & Limbach L.L.P.; Seong-Kun Oh

(57) ABSTRACT

An image controlling device and method thereof is provided with superior operability when making selections from a menu displayed on a display device such as a CRT display. In the preferred embodiments of the image controlling device and method of the present invention, a menu is constructed by arranging a plurality of menu items three-dimensionally along a cylinder. A portion of these menu items is then displayed in such a manner that viewing is performed from the center of this cylinder outwards. The shifting velocity of the menu items is changed while all of the menu items are shifted in response to input signals from a controller operated by the user and the menu item arranged at the center of the picture is determined to be the selected menu item. When a following level exists for the selected menu item, this level is proceeded to and menu items are displayed on the display device in the same way. When the selected menu item does not have a following level an image corresponding to this menu item is displayed.

53 Claims, 20 Drawing Sheets

OTHER PUBLICATIONS

"Three Dimensional Selection Widget," IBM Technical Disclosure Bulletin, vol. 38, No. 2, Feb. 1995, pp. 423.

"Exponential Increases in Spin Control Rates," IBM Technical Disclosure Bulletin, vol. 37, No. 3, Mar. 1994, pp. 273.

"Spherical Menu Selector," Research Disclosure, No. 307, Nov. 1989, pp. 901.

"Uses of the Spherical Selector," Research Disclosure, No. 307, Nov. 1989, pp. 833.

"Virtual Reality Menu Systems," IBM Technical Disclosure Bulletin, vol. 36, No. 12, Dec. 1993, pp. 227–228.

* cited by examiner bitmap for button images (a)
menu arrangement
using pentagons (b)
menu arrangement
using hexagons (c)
menu arrangement
using rectangles

IMAGE CONTROLLING DEVICE AND IMAGE CONTROLLING METHOD FOR DISPLAYING A PLURALITY OF MENU ITEMS

This is a divisional of application Ser. No. 08/723,769, filed Sep. 30, 1996 now U.S. Pat. No. 5,898,435.

BACKGROUND OF THE INVENTION

1. Field of the Invention

The present invention relates to an image controlling device and method thereof, and more particularly relates to an image controlling device and method thereof capable of displaying a plurality of menu items and executing a function for allotting a selected menu item by a user selecting one menu item from a number of menu items.

2. Description of the Related Art

Graphical User Interfaces (hereinafter referred to as "GUI's") are currently the most commonly used construct. A graphically represented user interface displays menu items expressed by a bitmap (two dimensional data) on a display device such as a CRT display. With these kinds of GUI's, the user selects one menu item from a plurality of menu items arranged in a two dimensional plane by shifting a cursor using a keyboard and/or a mouse, with the functions corresponding to this menu item then being executed by a prescribed program.

For example, the menu shown in FIG. 1 is an example of a GUI where character data generated by a character generator is displayed as bitmap data. With this kind of menu, character strings are generated for each of the menu items and the generated character strings are listed in a planar manner and displayed on the screen. A prescribed character is then handled as a cursor, the user shifts the cursor using a keyboard and/or mouse etc. and one of the menu items (character strings) is selected in such a manner that the function to be executed is selected.

Further, with the menu shown in FIG. 2, image data is put to bitmap data and button-shaped menu items are generated, with the plurality of menu items generated being put side by side in a planar manner. One of these menu items (buttons) is then selected by the user shifting the cursor on the screen using an input device such as a mouse and the function to be executed is selected.

With this kind of menu where a GUI is displayed in a planer manner with menu items lined-up next to each other, when a number of menu items which cannot be shown to the user collectively on the screen are to be displayed, first, the number of menu items which it is possible to display are displayed and the remaining menu items are displayed in a new picture by a user designation or displayed by scrolling down the screen so that all of the menu items are displayed to the user.

When the user selects a menu item using this kind of method, there are cases where the picture display displaying the menu items changes dramatically between the initial picture and the new picture. Operation can therefore become confusing if a change is not made to a picture whose relationship with the picture before changing can be easily understood, as it is necessary for the user to have an image for the relationship between the picture before changing and after changing.

Further, when the cursor is shifted and a menu item is selected, it is necessary for the point of view of the user to follow the cursor and the position of the point of view is therefore separated from the menu item to be selected. As a result, when the menu item display becomes small or the number of menu items becomes large, it is difficult for the user to understand the relationships of the positions of the cursor and the menu items to be selected, with this therefore putting a load on the operation of the user selecting a menu item.

When a desired menu item is searched for with these kinds of two-dimensional (planar) GUI's, when displaying is carried out down to the menu item positioned at the end of the menu and the desired menu item has not been found, the original image is returned to and the desired menu item has to once more be searched for in the reverse direction.

The menu item selection operation is therefore complicated because an end exists to the menu. A menu item selection operation has therefore been considered where a three-dimensional GUI is constructed in imaginary three-dimensional space so as to eliminate the ends of the menu, with the user then carrying out a menu item selection operation by freely moving within this three-dimensional space.

For example, as shown in FIG. 3, virtual reality (VR) providing realistic reproductions in three-dimensional space is utilized, a metaphorical imitation of, for example, a building is provided within the virtual space and menu items are arranged about this metaphor. A user interface can then be considered where the user moves within the virtual space as though moving through real space and selects menu items.

However, operativity becomes poor when the user selects menu items because the constructed menu space becomes complicated. It is also necessary to use an arithmetic device (central processing unit) capable of processing graphics at high speed because complicated graphics processing is necessary.

SUMMARY OF THE INVENTION

As the present invention sets out to resolve these kind of circumstances, it is the object of the present invention to provide an image displaying device and method thereof of superior operativity when making selections from a menu displayed on an image displaying device.

In order to achieve the above object, an image displaying device of the present invention is constructed in such a manner that in a menu having a hierarchical structure, a plurality of menu items are arranged along a closed curved surface closed in at least one direction with the menu image then being displayed so that it is viewed from a viewpoint at the center of this curved surface.

By arranging the menu items within this kind of closed curved surface closed in at least one direction, when the number of menu items is increased, a larger number of menu items are provided to the user by making the radius of the closed curved surface larger. Further, the situation of the first menu item being displayed is automatically returned to when the desired menu item cannot be found.

Further, construction is such that when the user selects a menu item, all of the menu items to be provided to the user are made to shift together and the menu item it is wished to select is made to be displayed at a prescribed position within the picture for the image displaying device.

As a result, menu item selection can be carried out without needing a cursor.

The construction is also such that the shifting speed of the menu items can be made to change in response to the menu item selection operation of the user.

The load on the user in the menu item selection operation can therefore be alleviated by using this kind of construction.

DETAILED DESCRIPTION OF THE PREFERRED EMBODIMENTS

First Embodiment

Figure 1:
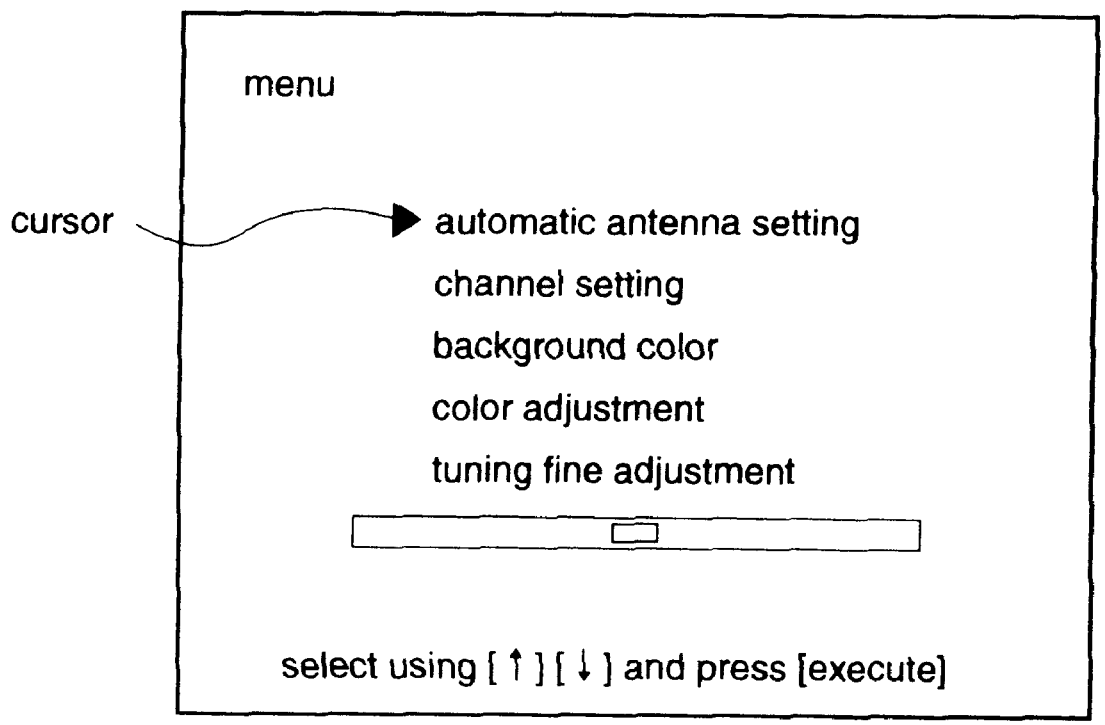
FIG. 1 is a view showing an example of two-dimensional GUI for a related character base.
Figure 2:
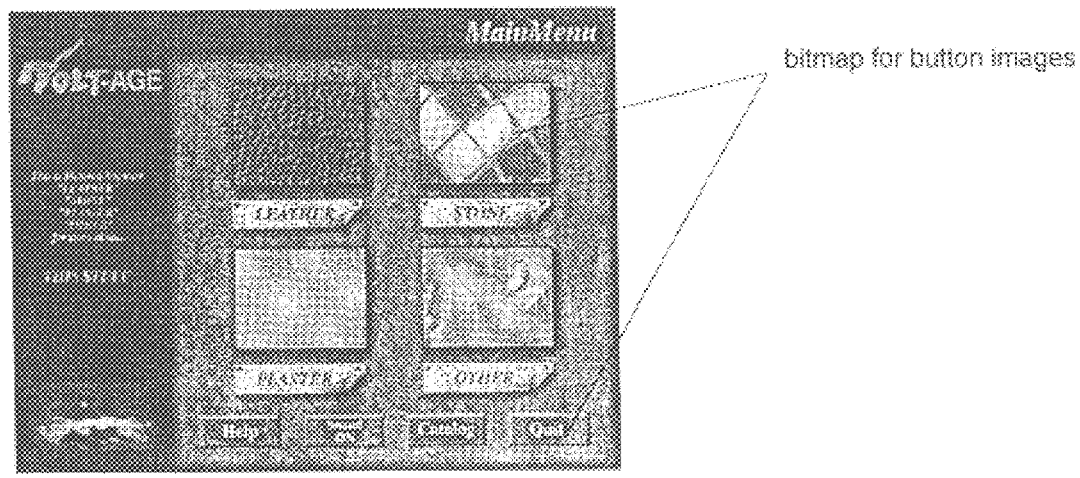
FIG. 2 is a view showing an example of a two-dimensional GUI for a related bitmap base.
Figure 3:
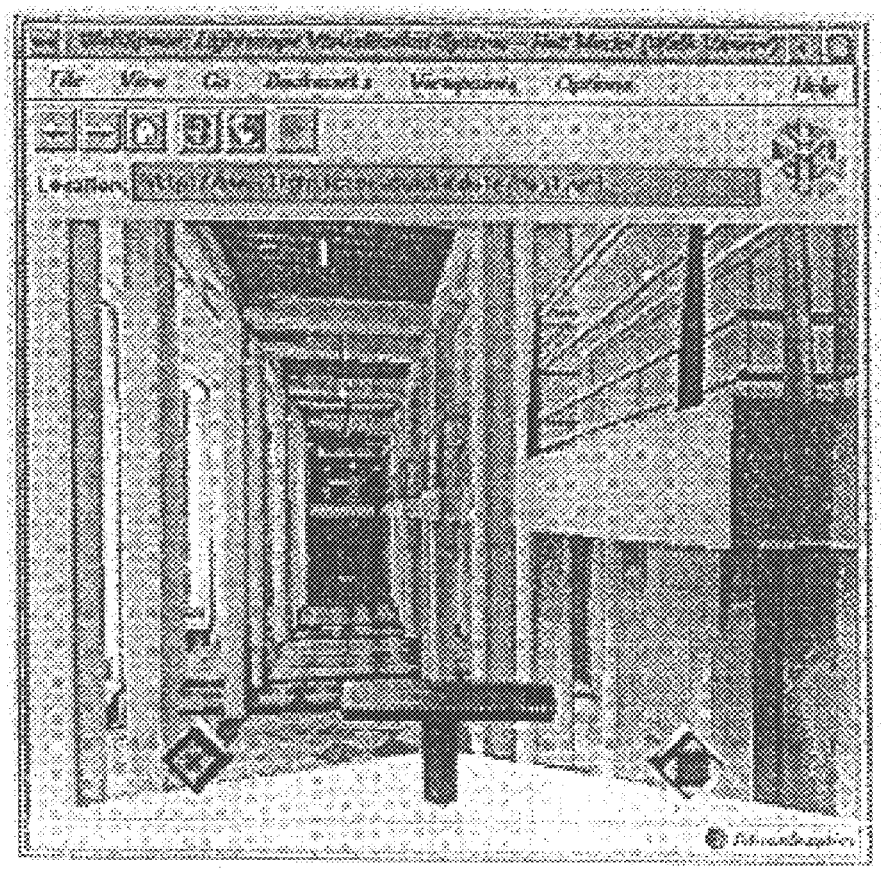
FIG. 3 is a view showing an example of a related three-dimensional GUI.
Figure 4:
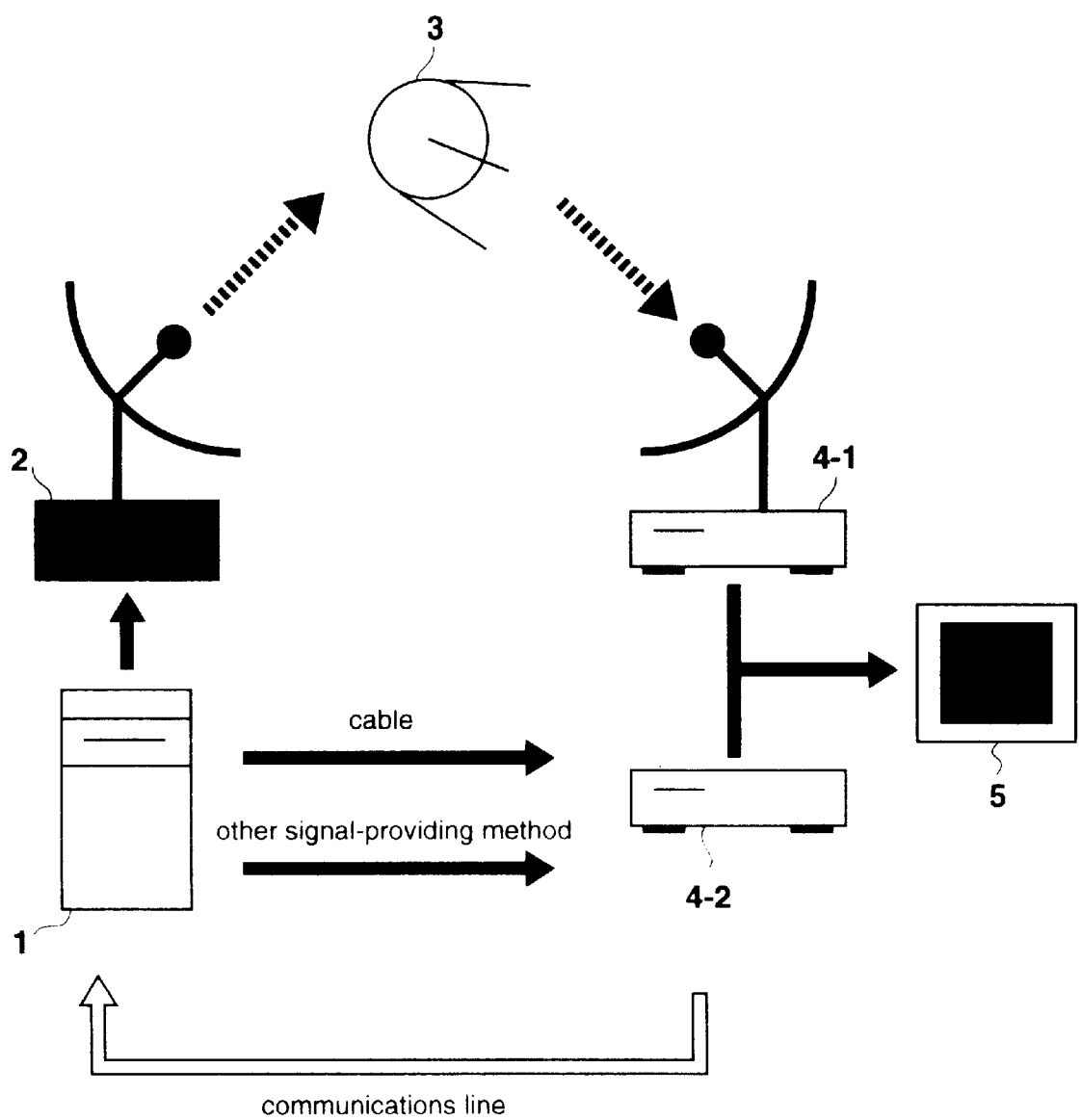
FIG. 4 is a view showing an example configuration of a VOD service system.

FIG. 4 shows an embodiment of a structure for a system for a Video On Demand (VOD: Video On Demand) service utilizing an image control device of the present invention.

A video server 1 provides various programs to users. The video server 1 transmits programs via a transmission device 2 and a broadcast satellite 3 or programs may be provided by wired transmission such as cable signal-providing or signal-providing using ground waves.

A set-top box 4-1 receives the programs transmitted by the broadcast satellite 3 and displays these program images etc. on an image displaying device 5 in accordance with user operations. Similarly, a set-top box 4-2 receives programs provided by a cable signal or a ground wave signal etc. and displays these program images etc. on the image displaying device 5 in accordance with user operations.

Further, the set-top boxes 4-1 and 4-2 send a control signal for controlling the video server 1 to the video server 1 via a communications line such as a cable, public line network, dedicated line or wireless line based on an input signal from the user.

Figure 5:
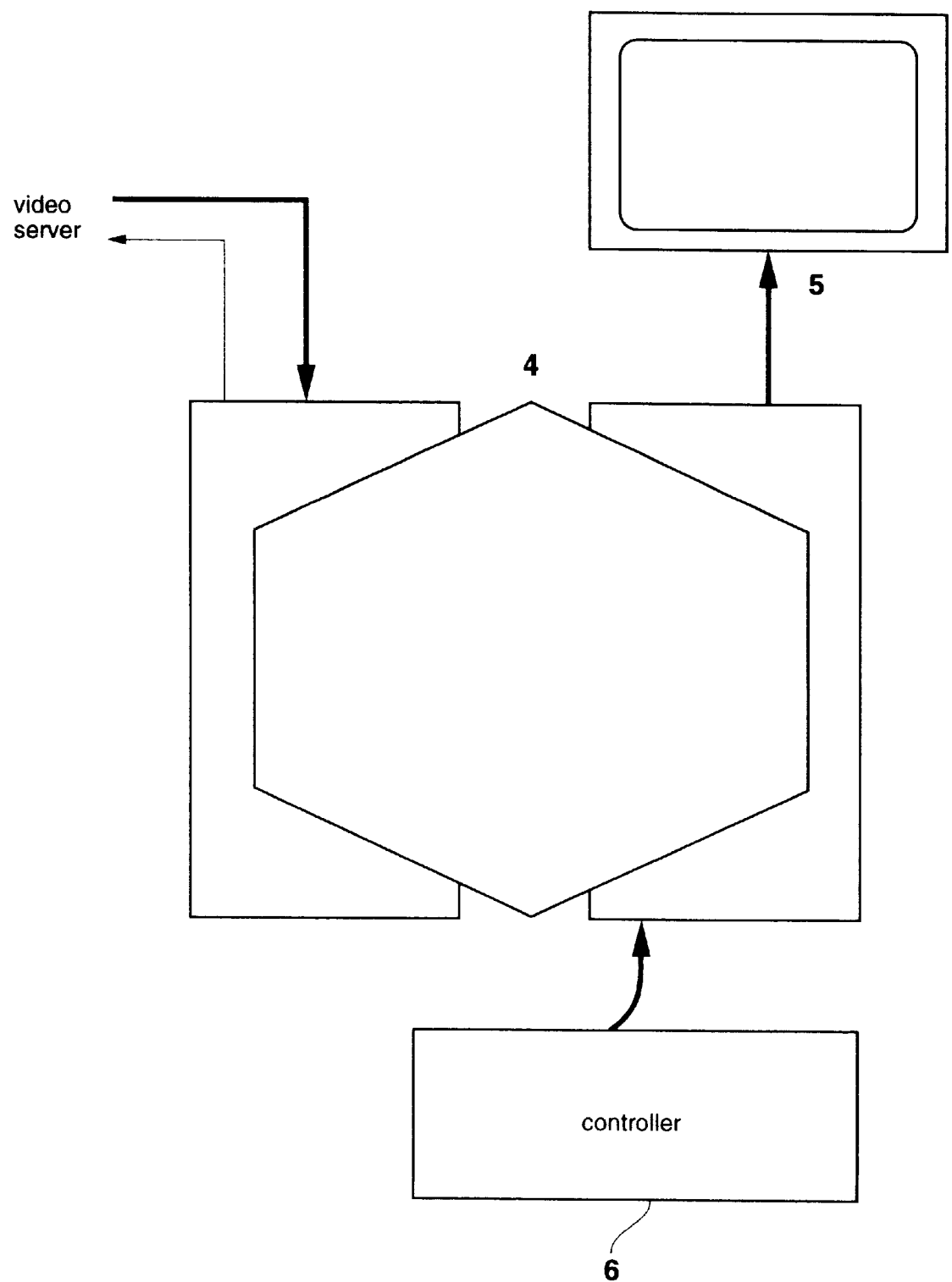
FIG. 5 is a view showing an example configuration of an image controlling device of the present invention.

FIG. 5 shows an example configuration of an image control device of the present invention. This example configuration comprises a set-top box 4, image display device 5 and controller 6. The set-top box 4 receives data transmitted from the video server 1, the user operates the controller 6 and this data is displayed on the image display device 5. The set-top box 4 also sends a control signal for requesting information such as the program selected by the user to the video server 1 based on an input signal from the controller 6 as necessary.

Figure 6A:
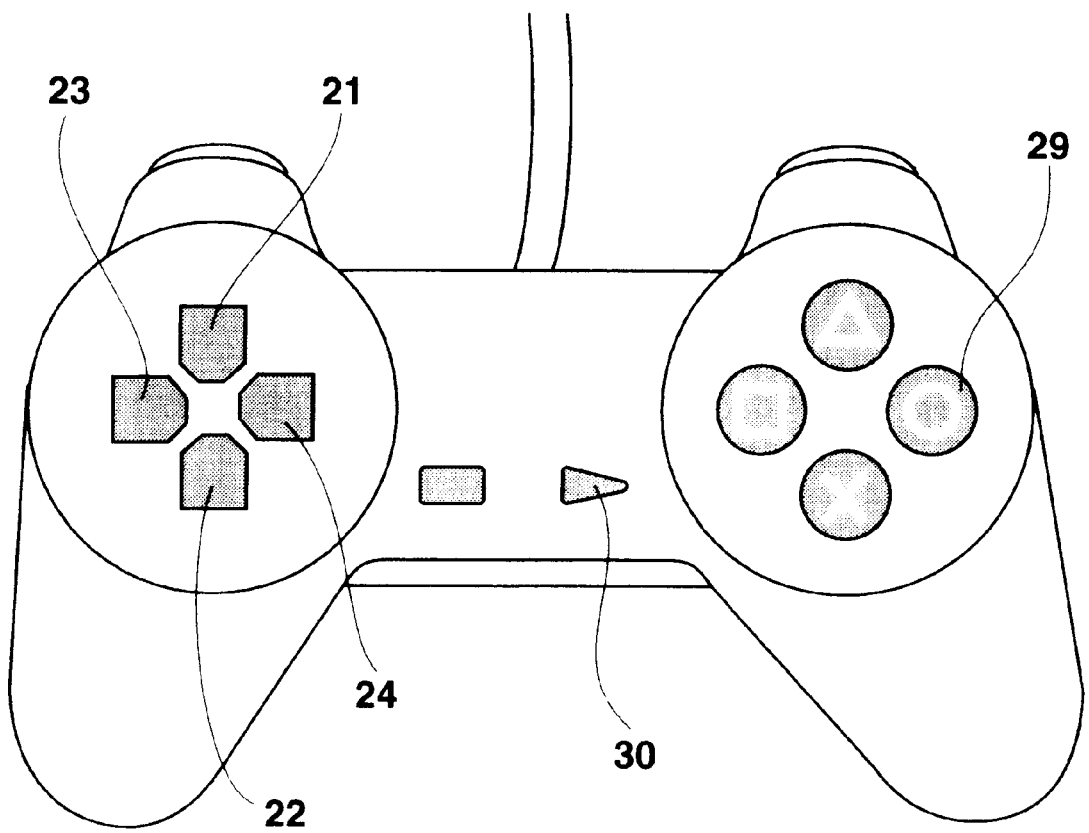
FIG. 6A and FIG. 6B are views showing an example configuration of the controller 6 of FIG. 5.
Figure 6B:
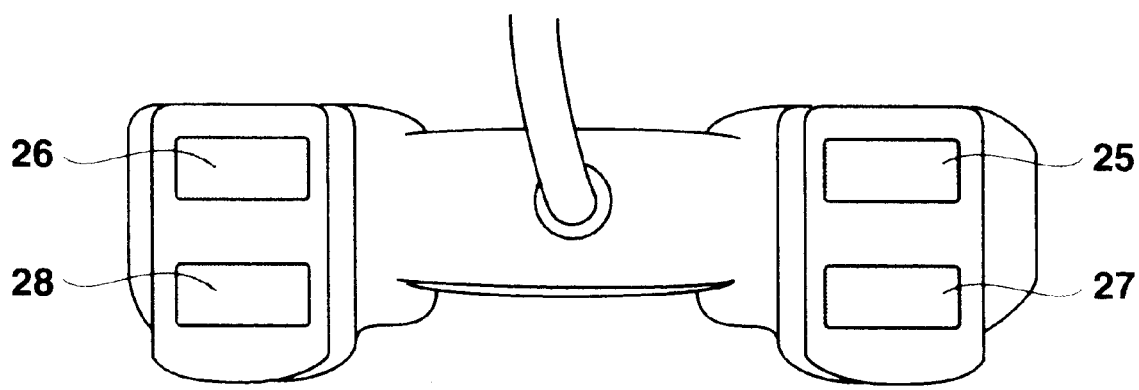

FIG. 6A and 6B are views in front and side elevation, respectively, showing an example of the configuration of the controller 6 of the embodiment of FIG. 5. The controller 6 is equipped with up, down, left and right buttons 21 to 24, an L button 25, an R button 26, a U button 27, a D button 28, an information button 29 and a reset button 30. The user then selects menu items in the menu displayed on the image displaying device 5 by operating these buttons 21 to 30.

Figure 7:
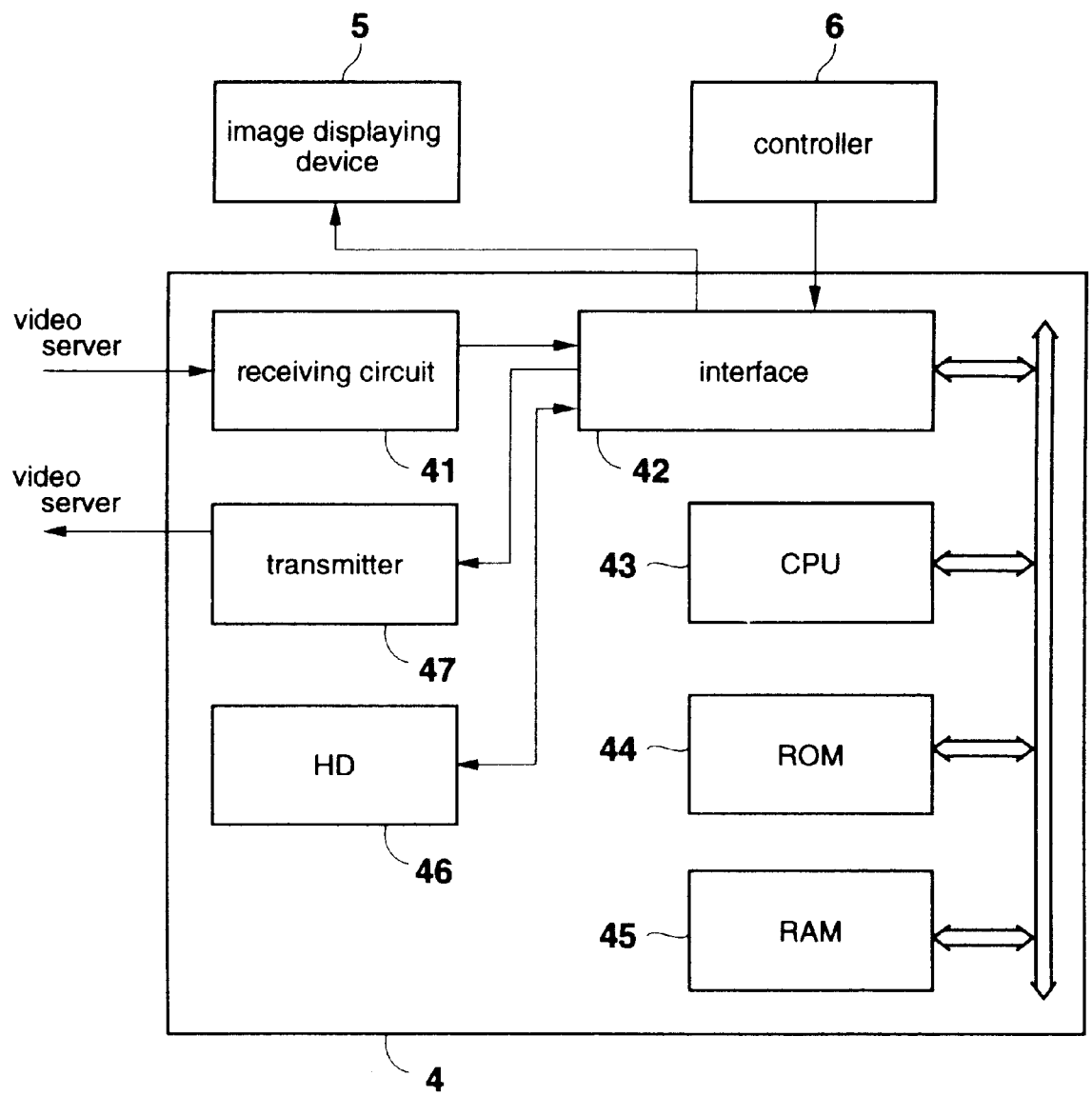
FIG. 7 is a block diagram showing the configuration of the set-top box 4 of FIG. 5.

FIG. 7 shows an example configuration of the set-top box 4 (4-1, 4-2) shown in FIG. 4 and FIG. 5. This embodiment is also equipped with a receiving circuit 41. This receiving circuit 41 receives programs provided by the video server 1 and provides these programs to the CPU 43 via an interface 42. The CPU 43 then stores this data on a hard disc (HD) 46 as necessary.

A transmitter 47 sends a control signal, inputted via the interface 42, for requesting program data generated at the CPU 43 based on an input signal inputted from the controller 6 to the video server 1.

The CPU 43 processes menu selection operations based on programs stored in the ROM 44 and input signals from the controller 6. Further, three-dimensional coordinate space structure data changed in accompaniment with the menu selection operation is updated. The image corresponding to the menu selection operation is then displayed on the image display device 5 via the interface 42 based on the up-dated three-dimensional coordinates. When the CPU 43 carries out this kind of processing the RAM 45 temporarily stores the programs and data etc.

A dedicated CPU (for example, an LSI Logic (trademark) R3000 (trademark)) and graphics CPU (GPU: Graphical Processing Unit) capable of producing three-dimensional pictures in real-time operating together with this CPU 43 are used at this CPU 43. Alternatively, a CPU with graphics functions added or a dedicated CPU capable of high-speed processing can be used as a single unit in place of this kind of CPU.

Figure 8:
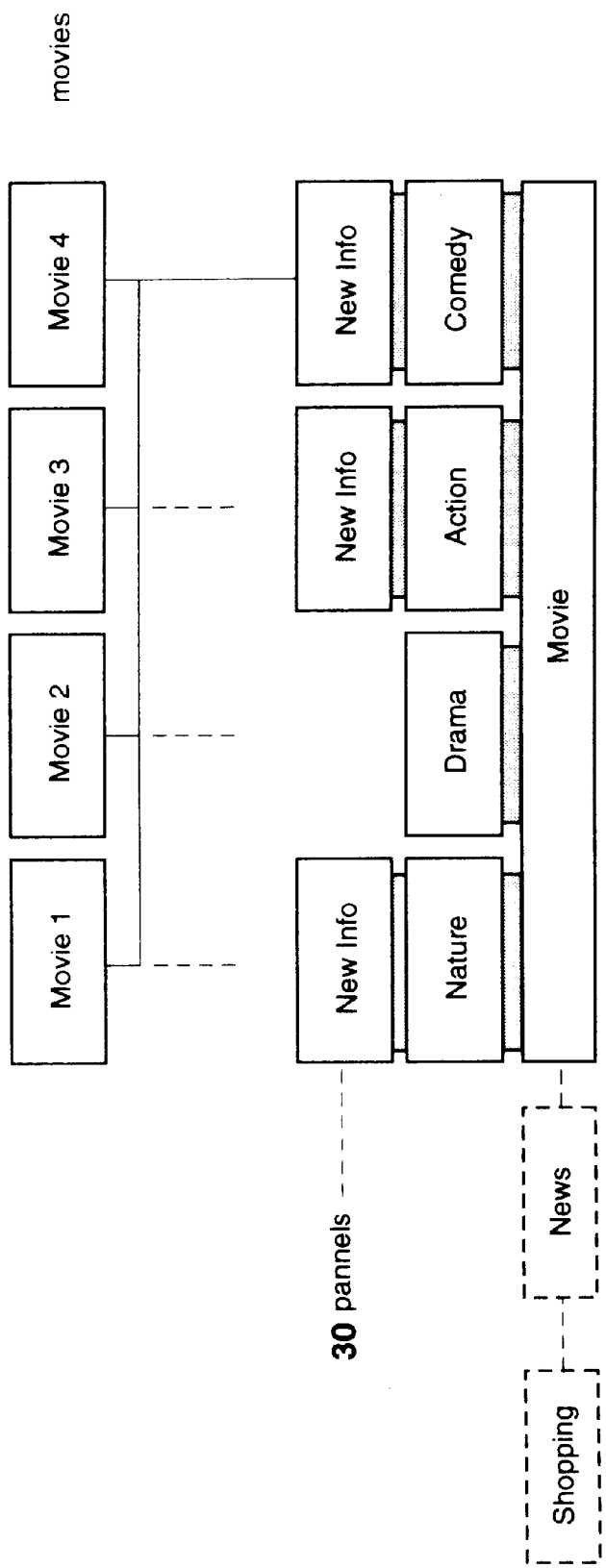
FIG. 8 is a view showing an example of the hierarchical structure of programs provided using the VOD service.

FIG. 8 schematically shows an example of the hierarchical structure of programs provided by the VOD service. In this example, the categories for movies provided by the VOD service are Nature, Drama, Action, Comedy and others, giving 30 categories, with four movies 1 to 4 currently prepared within "Comedy". New information relating to movies listed anew in the respective movie categories for the video server 1 is also added to nature, action and comedy.

Figure 9:
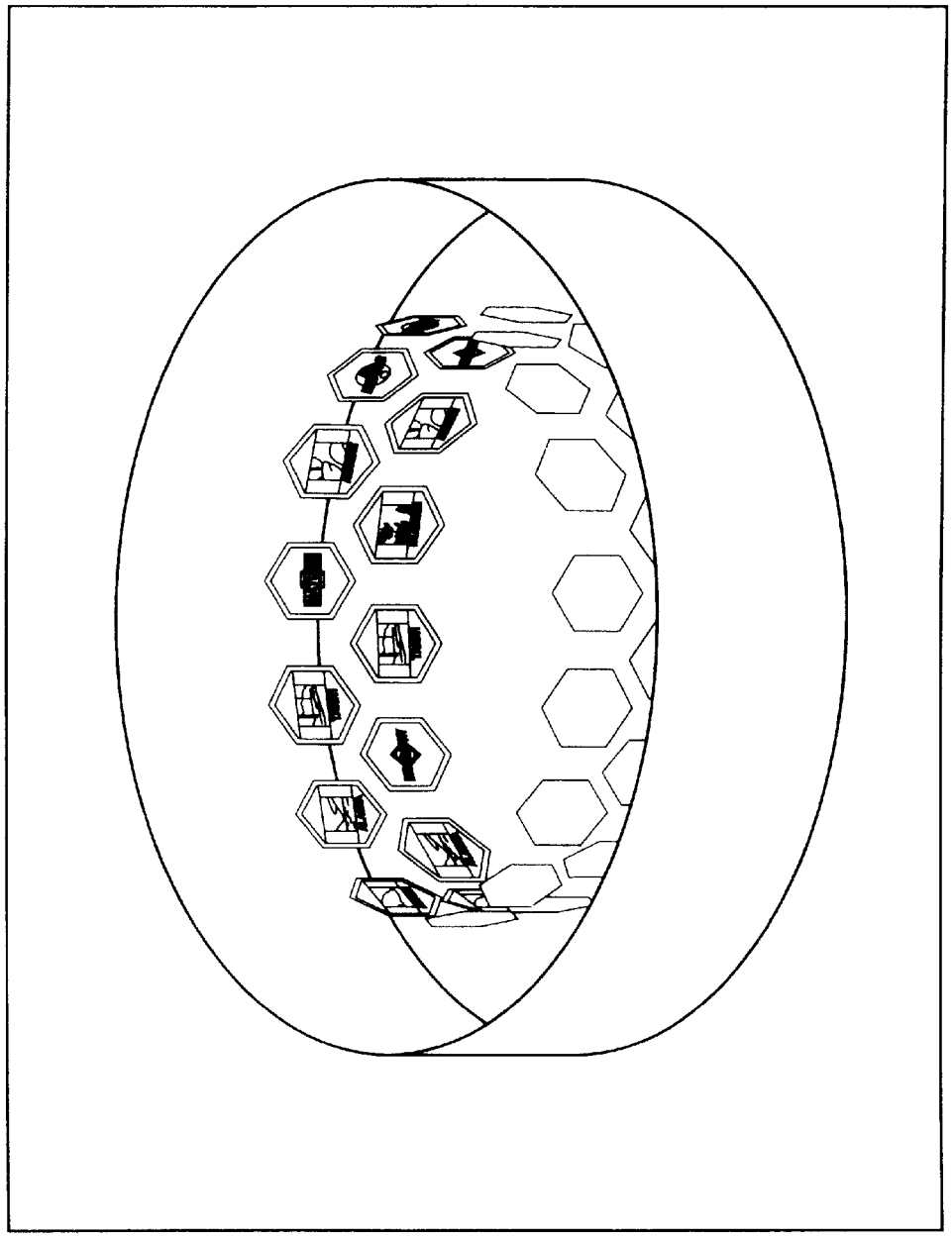
FIG. 9 is a view showing all of the menu items occurring in the first embodiment.

FIG. 9 shows the menu configuration of this embodiment. This menu is provided with a plurality of hexagonal menu items arranged cylindrically in such a manner that corresponding edges are almost parallel. These menu items correspond to the levels nature, drama, action and comedy, respectively, as. shown in FIG. 8. The titles and symbols for information possessed by these menu items is then displayed in the center of the menu items using a bitmap.

Figure 10:
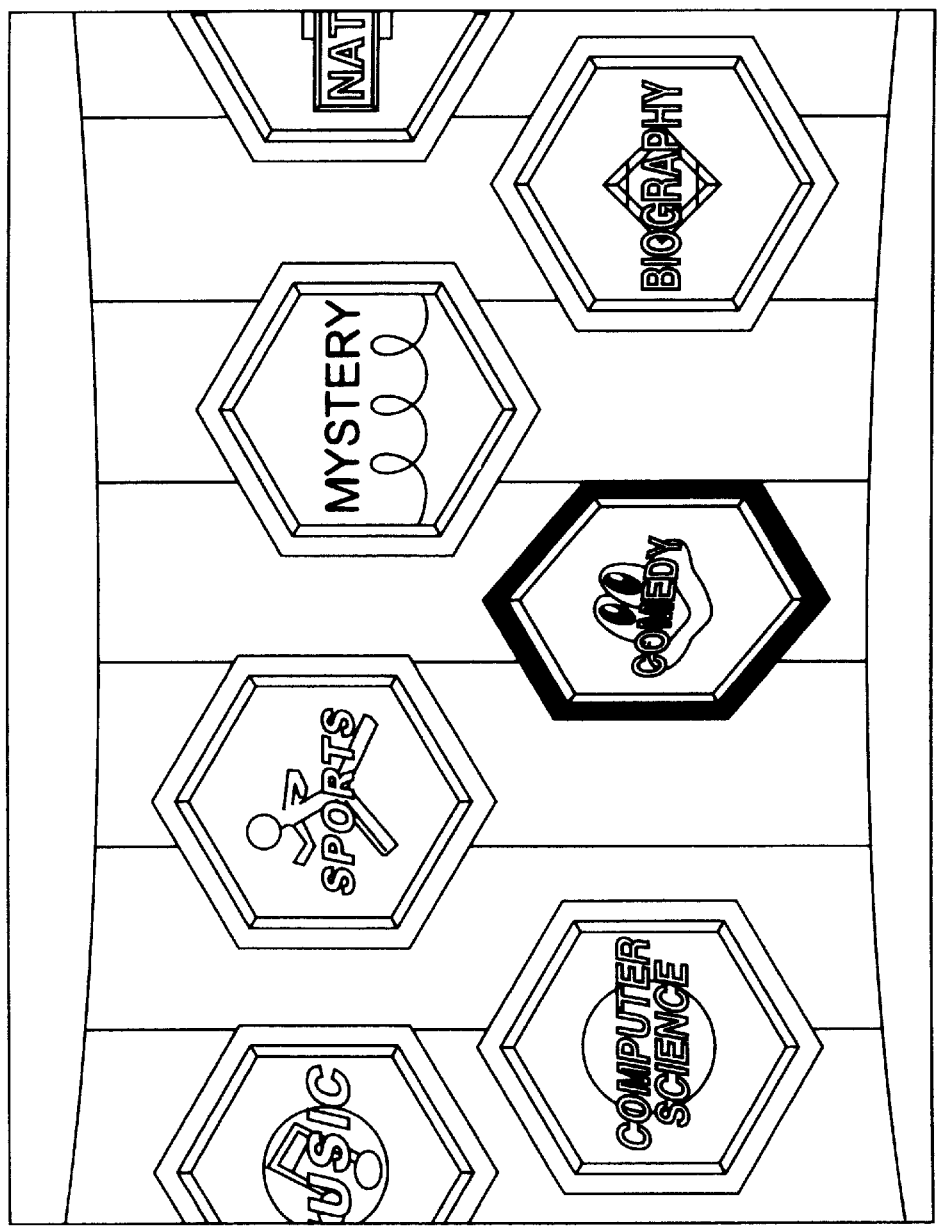
FIG. 10 is a view showing an example menu item display.

FIG. 9 shows the overall configuration of the menu. However, in reality, when the menu is displayed at the image display device 5, the viewpoint position is prepared in the region of the center of the cylindrical space so that viewing is performed from the center of the cylinder to the outside. For example, as shown in FIG. 10, a fixed number of menu items are displayed on the image display device 5 using a number which makes selection by the user simple.

Further, for example, coordinate information for the viewpoint occurring in three-dimensional space, line of view direction information and angle of field of viewing information are given as information regarding the viewpoint necessary for displaying the menu on the image display device 5. The line of view direction information shows which direction from the viewpoint position the menu item displayed on the image display device 5 is in. The angle of field of viewing information includes display parameters showing the whereabouts of the range of the menu items displayed at the image display device 5 taking the line of view direction as the center. This information is stored in the RAM 45.

By arranging the menu items cylindrically, only a number of menu items which are extremely simple to select from are displayed. Further, because the menu items are displayed cylindrically, when the number of menu items increases, a greater number of menu items can be easily provided without the user being made aware of an increase in the menu items simply by increasing the radius of the cylinder. Moreover, as the cylinder is a curved surface closed in the cylindrical direction, when, for example, a menu item is searched for in the right direction and the desired item is not found, the conditions of displaying the initial menu item are automatically returned to. This point is markedly different from when the menu items are arranged in a plane and the end is reached, where an operation becomes necessary for simply returning (not searching).

In the embodiments above and below, descriptions are given of menu items arranged cylindrically. However, the cylinder can be partitioned by the menu item number or a greater number, with the menu items then being arranged along a curved surface (polygonal column) closed in one direction linking these points of partition in a straight line.

Further, the shape of the menu items is by no means limited to hexagonal shapes, and triangular shapes, quadrilateral shapes and pentagonal shapes are also possible.

Description of Operation

Next, the menu item selection control operation is described with reference to the flowchart of FIG. 11 and the image display examples of FIG. 12 to FIG. 24.

Figure 11:
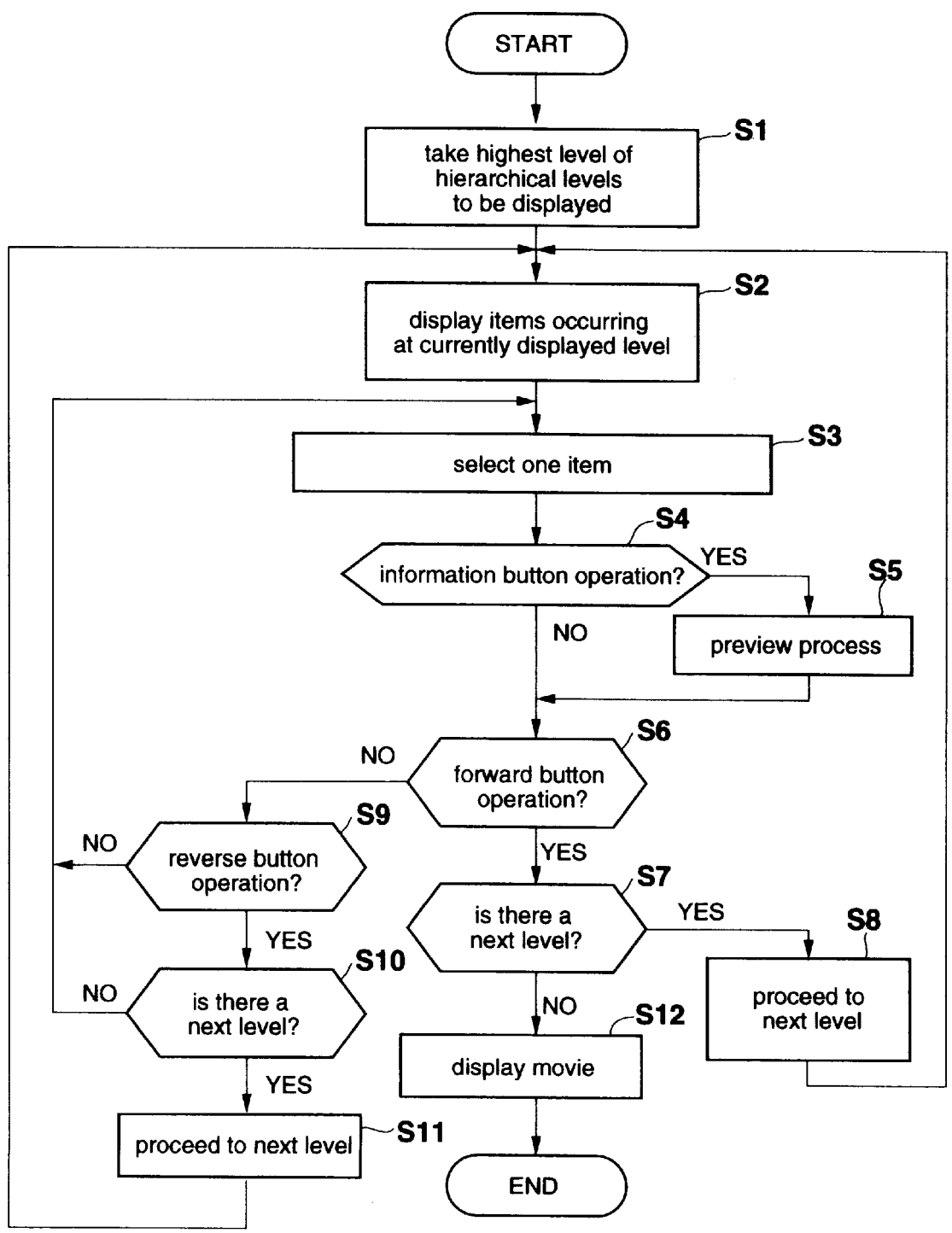
FIG. 11 is a flowchart illustrating the operation of the image controlling device of the present invention.
Figure 12:
FIG. 12 is a view showing an example of a picture displayed when a menu item is selected at the image controlling device of the present invention.
Figure 13:
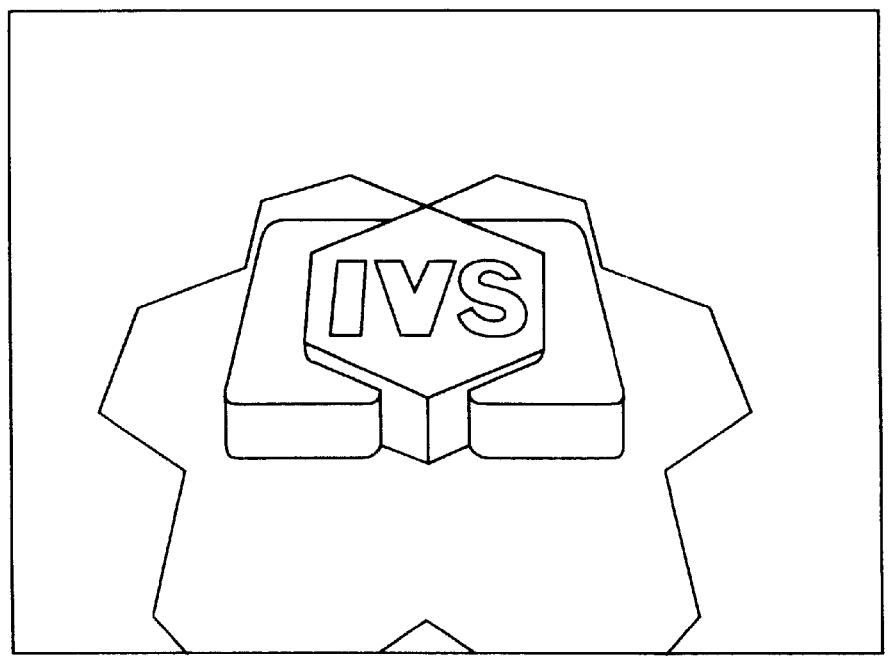
FIG. 13 is a further view showing an example of a picture displayed when a menu item is selected at the image controlling device of the present invention.
Figure 14:
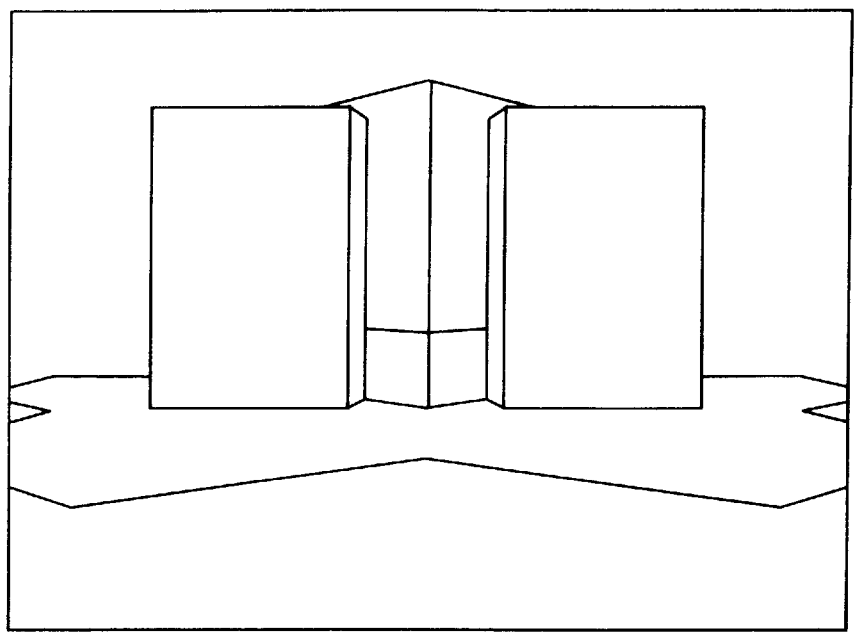
FIG. 14 is another view showing an example of a picture displayed when a menu item is selected at the image controlling device of the present invention.

First, when the power supply for the device is put on, in step S1 of FIG. 11, the CPU 43 makes the image display device 5 display the kind of opening picture shown in FIG. 12 at the image displaying device 5. Images of entering a building are then sequentially displayed in the way shown in FIG. 13 and FIG. 14.

Figure 15:
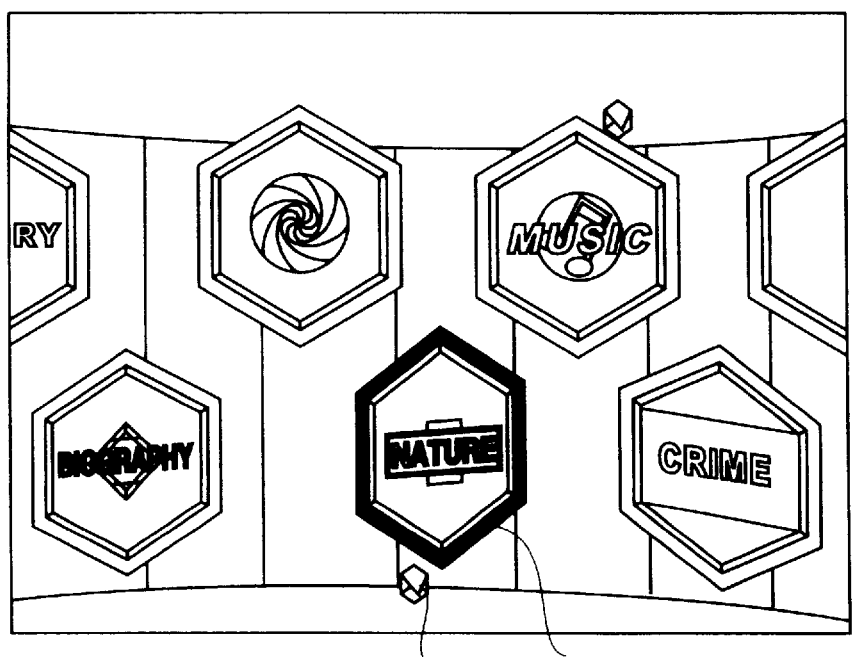
FIG. 15 is a still further view showing an example of a picture displayed when a menu item is selected at the image controlling device of the present invention.

Next, in step S2, as shown in FIG. 15, the menu item for the highest level is displayed at the image display device 5. When this menu item has new information occurring in the VOD service, i.e. when there is a new information level at the lower information level in FIG. 8, the periphery of these menu items 61 is surrounded with a simultaneously-displayed image of a small object 62. For example, the existence of new information within the menu items MUSIC and NATURE can be shown as in FIG. 15 by using the metaphor of the movement of creatures such as birds or insects etc. gathering about flowers or food.

In this way, when new information has been added to the menu item, an image of a prescribed object is displayed moving about the periphery of the menu item which has had new information added. The user can therefore easily comprehend that new information has been added to the menu item. The operativity when the user selects the menu item can therefore be increased.

Then, in step S3, the user operates the controller 6 and selects one menu item from the menu. At this time, the user operates the left and right buttons 23 and 24 (fine operations) or the L and R buttons 25 and 26 (large scale operations) so as to rotate the cylinder (all of the menu items) shown in FIG. 9 to the right or left to a small or large extent and sequentially show the menu items on the screen of the image displaying device 5.

Figure 16:
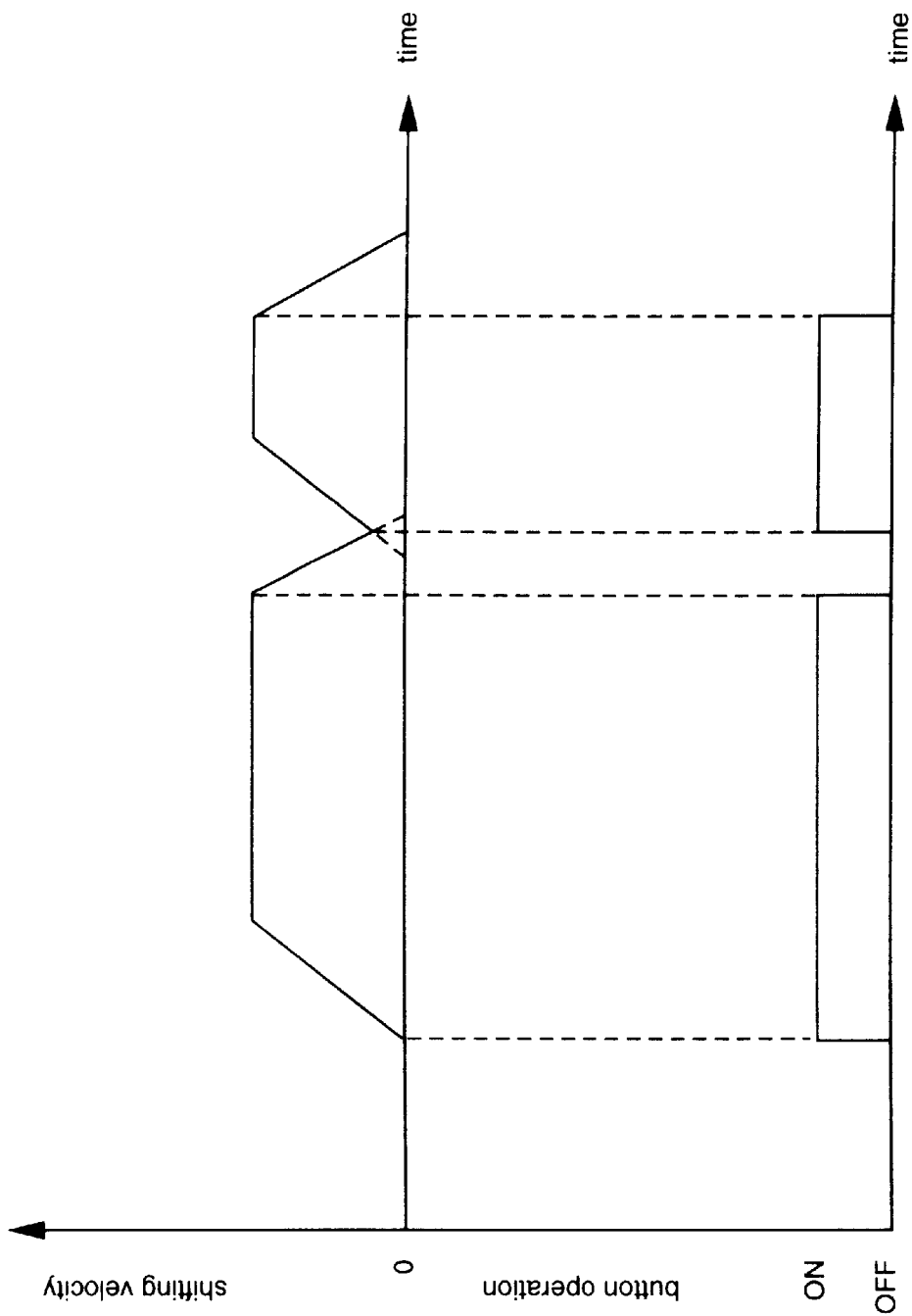
FIG. 16 is a view showing changes in the shifting velocity of the menu items corresponding to operations occurring at the controller 6.

In this embodiment, the construction is such that the velocity of shifting the menu items is changed in the way shown in FIG. 16 in response to the time of the user pressing the operation buttons 23 to 26 for shifting the menu items. In this way, when the operation buttons 23 to 26 are repeatedly pushed on and off, the shifting velocity can be changed smoothly without dramatic changes in the shifting speed of the menu items occurring. As a result, the menu is shifted using an operation suited to peoples senses which is not incompatible with the user.

As shown in FIG. 16, when the operation buttons 23 to 26 for menu item shifting are pressed, first, the shifting velocity for the menu items is increased at a prescribed acceleration. When the prescribed velocity is then reached, the shifting of the menu items continues at this velocity. When an operation button is then released, the shifting velocity decreases at a prescribed acceleration (deceleration) and then stops. When the same operation button is then pressed again during decreasing of the shifting velocity, the shifting velocity will again increase. When the prescribed velocity is then reached, the shifting continues at this velocity. When the operation button is then released, the shifting velocity falls until finally the menu items come to a halt.

The left and right buttons 23 and 24 are for fine-shifting the menu items and the L and R buttons 25 and 26 are for dramatically shifting the menu items. This shifting velocity at the time of acceleration and fixed velocity are therefore made to be different for the left and right buttons 23 and 24 and the L and R buttons 25 and 26. For example, the values for the shifting velocity at the time of acceleration and fixed velocities at the L and R buttons 25 and 26 are set to be greater at the L and R buttons 25 and 26 than at the left and right buttons 23 and 24.

Further, as the left and right buttons 23 and 24 are used in the fine-shifting of the menu items and the user can therefore accurately control rotation of the menu, rotation of the menu can also be made to stop when the left and right buttons 23 and 24 are released.

The rate of change of velocity (acceleration or deceleration) during the acceleration and deceleration in FIG. 16 is fixed but can be set to be changed in a complicated manner so that the user can make selections as he or she pleases.

The load placed on the user in the operation of selecting the menu items can therefore be alleviated by changing the shifting velocity of the menu items in response to the user menu item selection operations.

In this way, the user makes the whole menu items shift and the desired menu item is arranged in the center of the screen (center of the horizontal direction), with the menu item is then selected (in the example in FIG. 15, NATURE is selected).

In this way, when the user selects a menu item, all of the menu items that are to be shown to the user are shifted together and menu items are selected without it being necessary to use the cursor used on the GUI's of the related art by displaying the menu items it is wished to select at a prescribed position within the picture of the image display device 5. The operativity at the time of menu item selection is therefore improved because the user only has to gaze at the menu item.

The color in which the outer edge of the selected menu items is displayed is made to be different to that of other items so that selected menu items can be more reliably displayed to the user and the selected menu items are also made to move in a different manner to other menu items. For example, unselected menu items (in this embodiment, menu items arranged outside the center of the picture) are made to move up and down slightly so as to appear to be floating, and selected menu items (in this embodiment, menu items arranged at the center of the picture) are made to revolve in the left and right directions within a prescribed scope (the range of the character surface displayed in the picture) taking the central axis of the vertical direction as a fulcrum. By doing this, the user can immediately distinguish currently selected menu items.

In the above, the whole of the menu items were shifted but the viewpoint direction i.e. the viewpoint arranged at the center of the cylindrical menu for displaying at the image display device 5 can be rotated.

Figure 17:
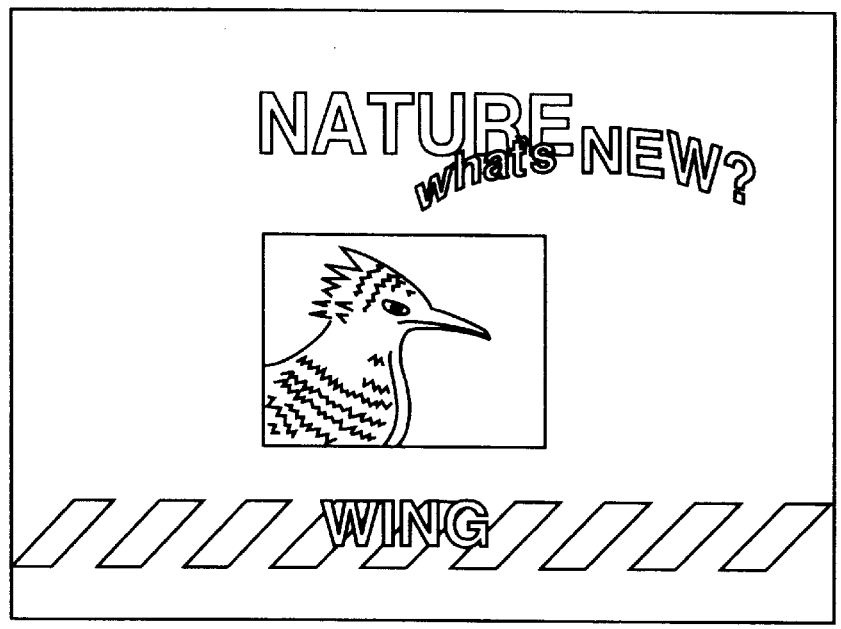
FIG. 17 is a view showing an example of a picture displayed when a menu item is selected at the image controlling device of the present invention.

In step S4, when the CPU 43 determines that the information button 29 has been pressed with a menu item having new information selected, step S5 is proceeded to and a preview of this information (for example, a preliminary preview) is displayed in the way shown in FIG. 17. If the information button 29 is then pressed again, the original picture (FIG. 15) is returned to. The user can therefore just view a preview of the new information by performing this kind of operation.

Next, in step S6, when it is determined that the forward button (upper button) 21 has been pressed, in step S7, the CPU 43 determines whether or not the selected menu item has a lower level. If so, this level (lower level) is proceeded to of step S8. In the case in this embodiment, NATURE has a lower level, as shown in FIG. 9, and this level is proceeded to in step S8. Step S2 is then returned to and the menu item for this level is displayed.

Figure 18:
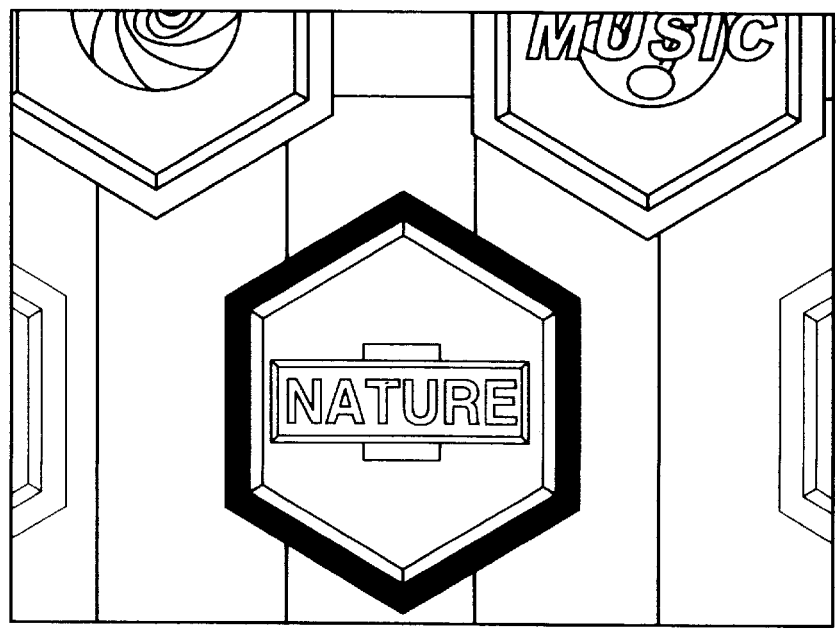
FIG. 18 is a further view showing an example of a picture displayed when a menu item is selected at the image controlling device of the present invention.
Figure 19:
FIG. 19 is another view showing an example of a picture displayed when a menu item is selected at the image controlling device of the present invention.
Figure 20:
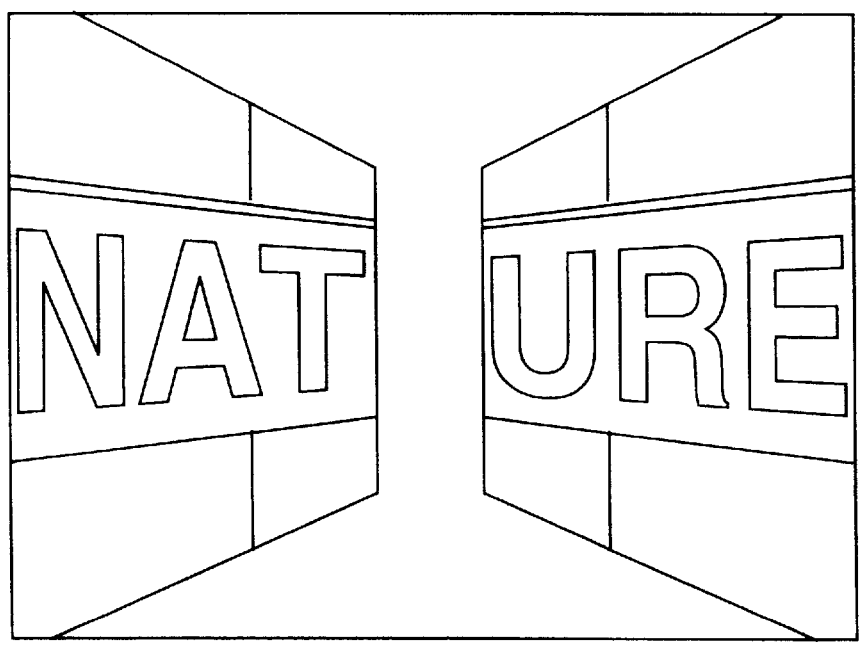
FIG. 20 is a still further view showing an example of a picture displayed when a menu item is selected at the image controlling device of the present invention.

When the forward button (upper button) 21 is pressed by the user and the lower level is proceeded to, the CPU 43 approaches the vicinity of the selected menu item, as shown in FIG. 18 and FIG. 19, and an image of a door opening and zooming-in is displayed on the image display device 5, as shown in FIG. 20.

In related two-dimensionally represented menus, a flat displaying method where the hierarchical structure of the menu is displayed to the top and bottom or to the left and right of the picture is adopted. In this embodiment, the menu is displayed in a three-dimensional manner. The menu is then configured so as to have a hierarchical structure in the depth direction (the direction of the line of view of the user within three-dimensional space) in three-dimensional space. This makes the user realize "Moving toward objects" in a natural way at the time of transitions between levels.

The overall menu is given a hierarchical structure in such a manner that the menu items for each level, in the same way as for the above-mentioned uppermost level, as shown in FIG. 9, are arranged cylindrically, with the menu items of the upper levels (previous levels) and the centers of the cylinders for the lower levels (following levels) being linked.

Figure 21:
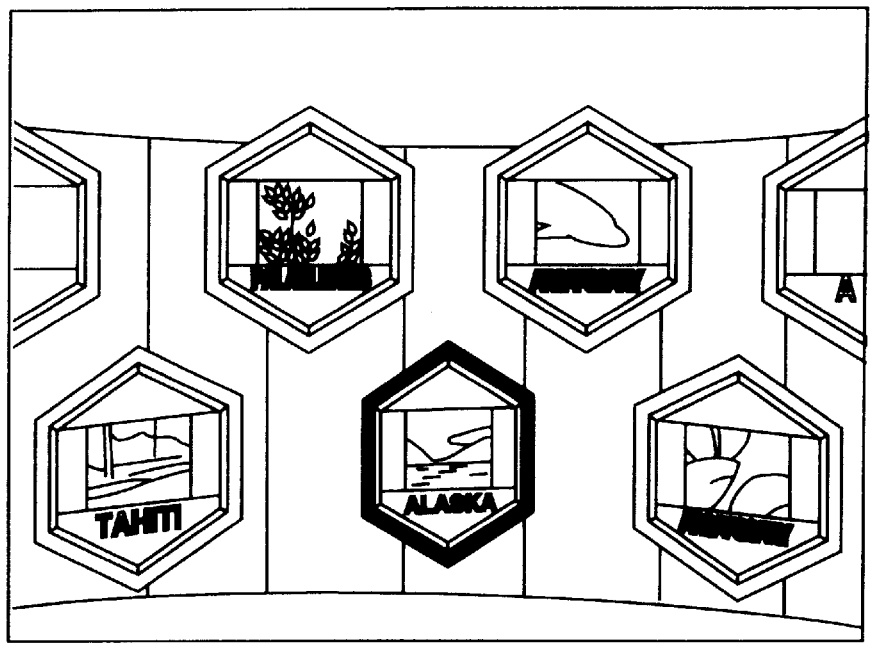
FIG. 21 is a view showing an example of a picture displayed when a menu item is selected at the image controlling device of the present invention.
Figure 22:
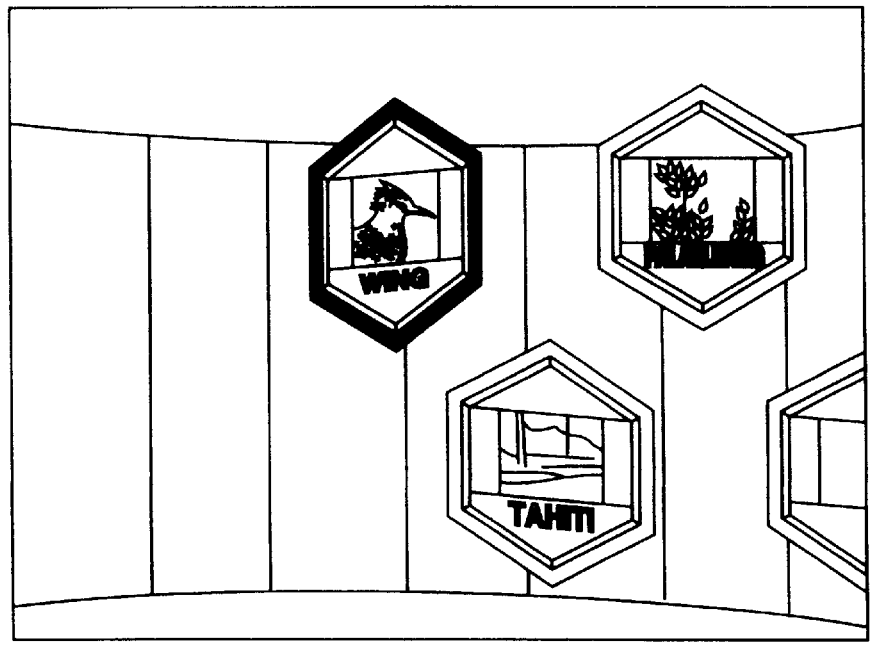
FIG. 22 is another view showing an example of a picture displayed when a menu item is selected at the image controlling device of the present invention.

When a transition is made to a lower level in step S8, then in step S2, the CPU 43 causes the menu for the level after shifting to be displayed at the image displaying device 5, as shown in FIG. 21. Then, in step S3, the user operates the controller 6 and a further menu item is selected. For example, in the example in FIG. 21, ALASKA is selected or, as shown in FIG. 22, the controller 6 is operated, the menu items are shifted by rotating the cylinder and the menu item WING is selected.

Further, when the forward button (upper button) 21 is operated, in step S7, a determination is made as to whether or not the menu item WING has a lower level. In this example, the menu item WING does not have a lower level (i.e. no movies corresponding to the menu item WING exist) and step S12 is therefore proceeded to.

Figure 23:
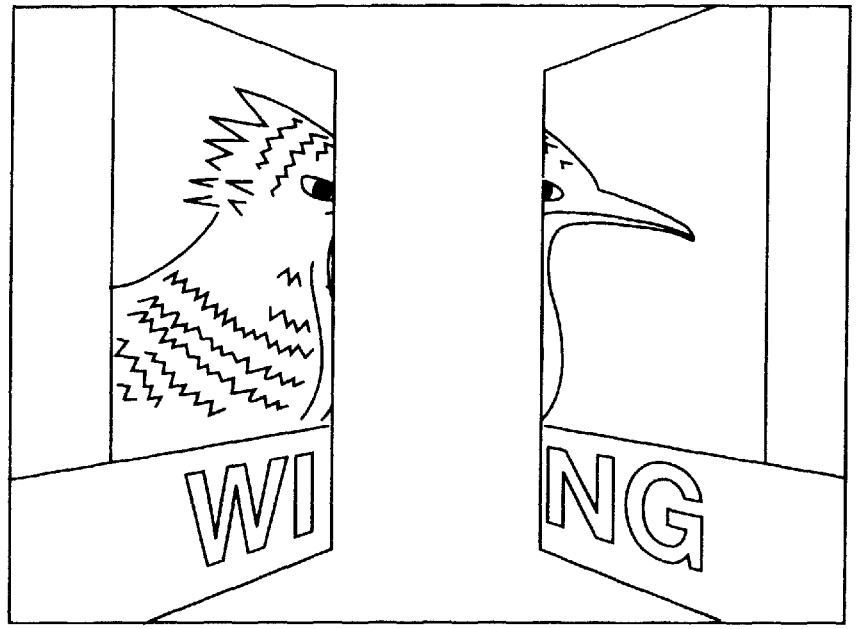
FIG. 23 is a further view showing an example of a picture displayed when a menu item is selected at the image controlling device of the present invention.

In step S12, in the same way as in the case of proceeding from the uppermost level to the next level, a zooming-in image of a door opening is displayed, as shown in FIG. 23. A control signal requesting an image corresponding to the menu item "WING" is then generated by the CPU 43 for the video server 1 and this control signal is transmitted to the video server 1 by the transmitter 47. After an image corresponding to the menu item "WING" transmitted from the video server 1 in response to this control signal is received by the receiver 41, this image is made to be displayed at the image displaying device 5 by the CPU 43.

Further, in step S6, when it is not determined that the forward button (upper button) 21 has been pressed and it is determined in step S9 that the reverse button (lower button) 22 has been pressed, step S10 is proceeded to and a determination is made as to whether or not an upper level exists for the current level at this point in time. When an upper level exists, this level (upper level) is returned to in step S11. When the upper level is returned to, the image zooms out and an image of a door closing is displayed. Step S2 is then returned to and the menu item at this level is displayed.

When it is determined in step S10 that an upper level does not exist, step S3 is returned to. Namely, in this case, a process for modifying the menu display is not carried out. In step S6 and step S9, the forward button (upper button) 21 and the reverse button (lower button) 22 are not pressed, step S3 is returned to and a new menu item can be selected.

Figure 24:
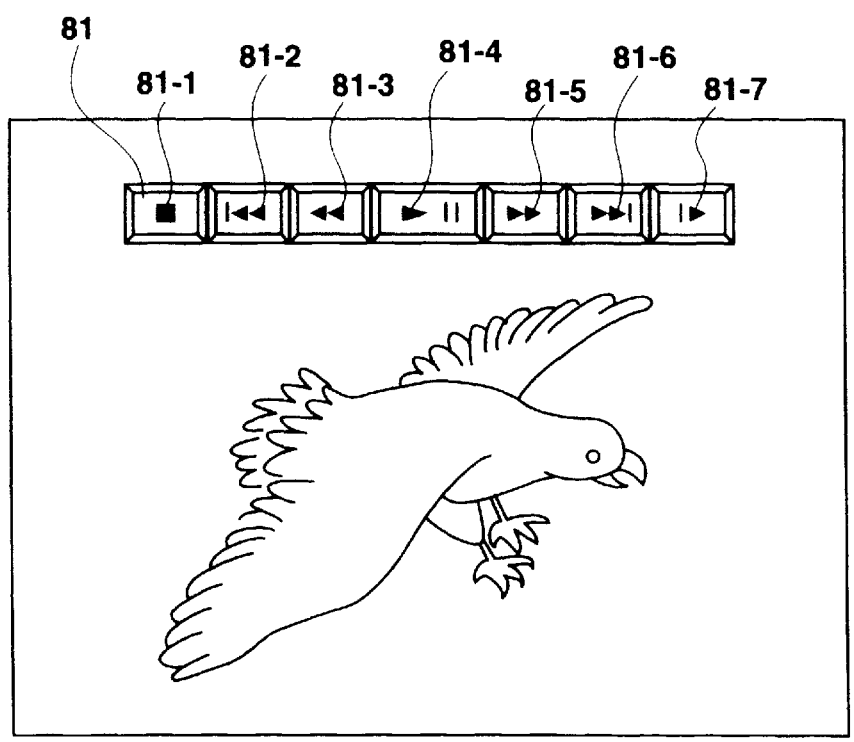
FIG. 24 is a still further view showing an example of a picture displayed when a menu item is selected at the image controlling device of the present invention.

As shown in FIG. 24, when the conditions for receiving a prescribed program occur at the final level, a control bar 81 for carrying out operations such as the playing-back of the displayed image is displayed when any of the operation buttons 21 to 27 of the controller 6 are pressed. This control bar 81 is then hidden after a prescribed period of time has elapsed when images are being played-back so as not to hinder the playing-back of images.

When any of the buttons (81-1 to 81-7) of the control bar 81 are selected by operating the left button 23 or the right button 24, and then the information button 29 is pressed to operate the selected button of the control bar 81, the processes corresponding to each of the buttons (81-1 to 81-7) are carried out. When the button 81-1 the furthest to the left in the drawing is pressed, the program is interrupted and one level above is returned to (or the conditions shown in FIG. 11 can be returned to). When button 81-2 is pressed, the position of the index previous to the image being played-back is returned to. When button 81-3 is pressed, high-speed reverse playback occurs. Button 81-4 is operated to start and stop playback.

Button 81-5 is operated at the time of high-speed forward playback (fast forward) and button 81-6 is operated to proceed to the next index position for the image being played-back. Button 81-7 is operated-for frame-by-frame playback.

When the reset button 30 is pressed by the user, the menu item selection operation being carried out at this time is reset, step Si is returned to and the selection operation is carried out again from the beginning.

By doing the above, the user can have the image displaying device 5 display the desired image by operating the controller 6.

As above, a menu is displayed with menu items having a hierarchical structure in the depth direction lined-up along a curved surface closed in at least one direction. Then, when there is shifting between levels, an image shifting in the depth direction is displayed. A method of operation is therefore realized in which users can easily understand operations occurring within the computer and the operativity when menu items are selected is improved.

Second Embodiment

Figure 25:
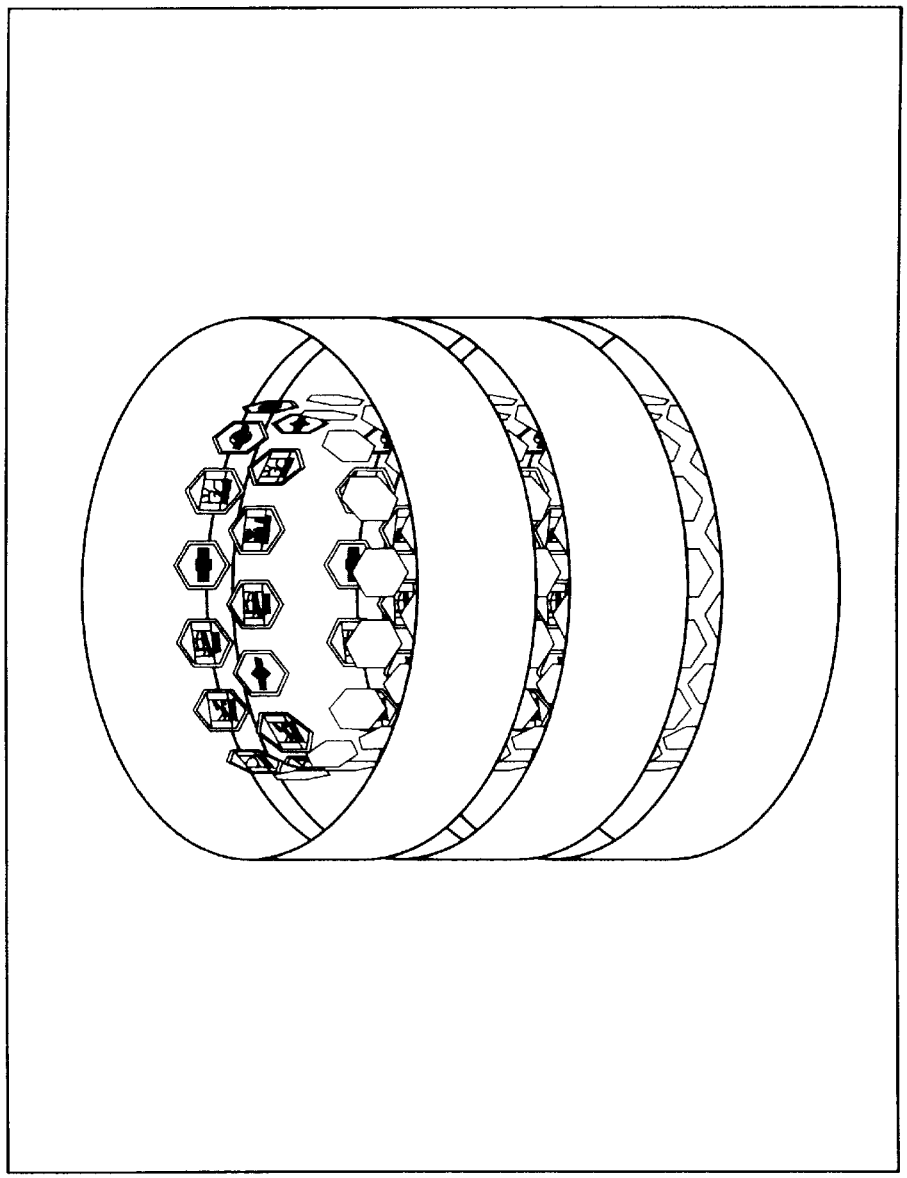
FIG. 25 is a view showing all of the menu items in the case of providing a plurality of services in a second embodiment.

A second embodiment of the image controlling device of the present invention is now described using FIG. 25.

In this second embodiment, the system configuration (FIG. 4) image controlling device configuration (FIG. 5 to FIG. 8) and the picture displaying operation (FIG. 10 to FIG. 24) occurring at the time of menu item selection are the same as the first embodiment and their detailed description is therefore omitted.

The image control device of the first embodiment is set-up to only process VOD services but the case of services for a plurality of categories other than movie (VOD) services such as, for example, on-line shopping and news etc. being transmitted from a prescribed server can also be considered. In this kind of case, these services are added to the same level as the movies shown in FIG. 8. As a menu, as shown in FIG. 25, the cylindrical menus described in the first embodiment are piled-up in the vertical direction in response to the number of services provided from the server. For example, from the top, the cylinders of FIG. 25 correspond to on-line shopping, movies and news services, respectively. These cylinders then each have pluralities of hexagonal menu items of the kind shown in the first embodiment.

The user uses the U-button 27 and the D-button 28 of the controller 6 to switch between service categories displayed on the image displaying device 5. For example, a menu item belonging to a movie service is currently displayed on the image-displaying device 5. When the user then wishes to shift to an on-line shopping service at the upper part of the movie cylinder, this can be achieved by pressing the U-button 27 of the controller 6. Further, when it is wished to shift to the news service at the lower part of the movie cylinder, this shifting can be achieved by pressing the D button 28.

In this way, cylindrical menus arranged from menu items running along curved surfaces closed in at least one direction having a hierarchical structure in the depth direction can be overlaid on top of each other. Menus in which every service is clearly divided can then be provided to the user by allotting each layer to a plurality of services provided by the server.

In the above a description is given of overlaying the highest menu levels for the plurality of services in the vertical direction. However, this menu overlaying technology is also applicable to lower levels within each service, i.e. menus can be structured in such a manner that cylinders are arranged above and below a lower level menu linked to a menu item arranged in such a manner as to neighbor a certain level. For example, giving a description using FIG. 10, the cylindrical menu corresponding to the lower level linking the menu items "COMPUTER SCIENCE", "SPORTS", "COMEDY", "MYSTERY" and "BIOGRAPHY" can be constructed in such a manner as to be overlaid from top to bottom in sequence.

By adopting this kind of configuration, when an upper level is returned to from a certain menu display, shifting to a separate lower level after this is no longer necessary as shifting to before a menu item link positioned directly next to an upper layer can be achieved using the U-button 27 and the D-button 28.

In this kind of case, by arranging the cylindrical menu circularly (i.e. arranging a tube in a ring-shape) the ends of the menu can be removed by forming the upper level as a cylinder and a menu which is consistent can be provided for the user.

However, it is preferable for menu items arranged up and down as cylindrical menus not to be displayed on the same screen so as not to confuse the user. In this case, sufficiently similar results can be obtained simply by piling up cylindrical menus with both ends thereof being linked as a data structure, because the user cannot recognize the curvature in the vertical direction from the screen display.

Third Embodiment

Figure 26:
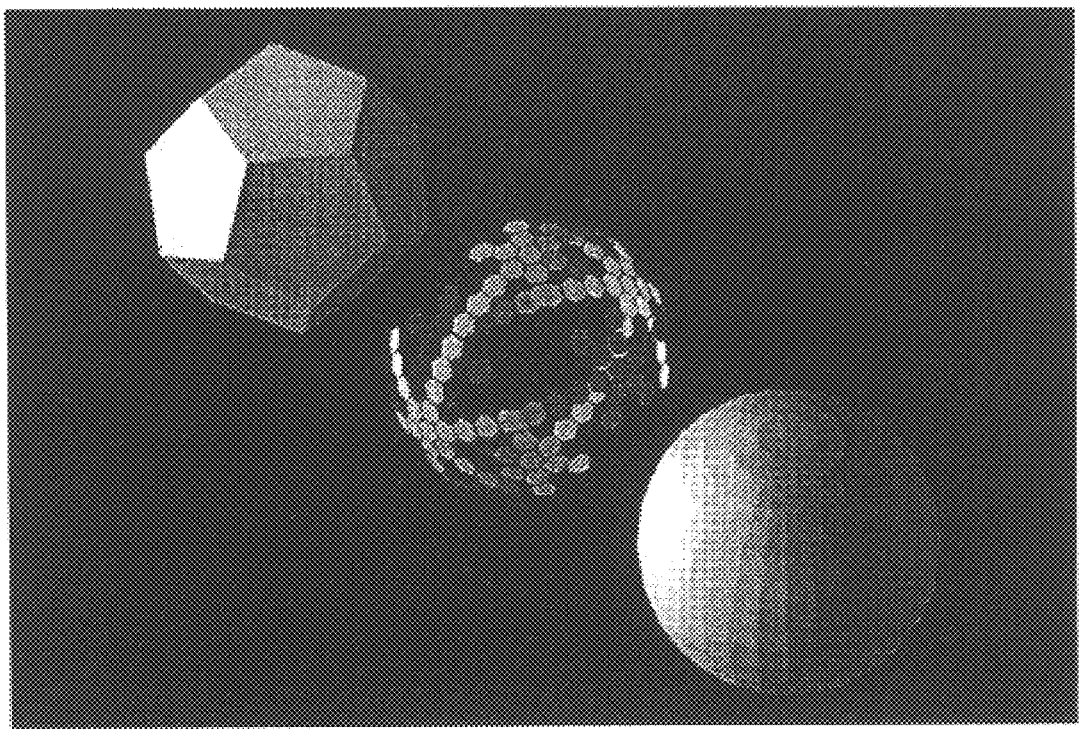
FIG. 26 is a view showing an example of the arrangement shape of menu items occurring in a third embodiment.

The following is a description of a third embodiment of the present invention using FIG. 26.

In this third embodiment, the system configuration (FIG. 4), the configuration of the image controlling device (FIG. 5 to FIG. 8) and the picture displaying operation occurring at the time of menu item selection (FIG. 10 to FIG. 24) are the same as for the first embodiment and their detailed description is omitted.

In this embodiment, as shown in FIG. 26, three-dimensional closed curved surfaces where each surface is formed from polygons of the same or almost the same surface area regardless of position are used as the shapes arranged for the menu items with the menu items then being provided along these closed curved surfaces. The menu items are then displayed by the image displaying device 5 so that these items can be viewed at each surface from the center of the closed curved surface. In addition to multi-sided polyhedrons such as tetrahedrons (formed from triangles), hexahedrons (formed from quadrangles) dodecahedrons (formed from hexagons) and icosahedrons (formed from triangles), this kind of three-dimensional shape can also be formed from combinations of pentagonal surfaces and hexahedronal surfaces, so as to give three-dimensional soccer-ball-type shapes.

The degree of freedom for the shifting direction (up, down, left, right, inclined) for selecting menu items therefore becomes large by arranging the menu items on a polygonal body. Further, the menu items can be classified into a number of categories, with it then being possible to gather together regions displayed within the closed curved surface every category.

However, when this kind of closed curved surface is utilized, if a sphere having the kind of rectangular surfaces shown as (c) in FIG. 26 is used, the area of a display surface (one rectangle) becomes small as the axis of the sphere is approached and it becomes difficult to display the menu items. For this reason, closed curved surfaces comprising polygons having almost the same surface area of the kind shown as (a) in FIG. 26 are used.

What is claimed is:

1. An image controlling device for controlling displaying of a menu image having a plurality of menu items arranged in an inner side of a multi-dimensional space having a cylindrical shape, comprising:

input means for inputting an instruction from a user for selecting said plurality of menu items;

controlling means for carrying out a process for shifting said plurality of menu items within said multidimensional space in the same direction at the same velocity in response to a signal from said input means;

selecting means for carrying out a process for deciding upon one of said menu items at a prescribed position based on the shifting process of the controlling means such that when one of said menu items is shifted to said prescribed position, said menu item at said prescribed position is automatically determined as the selected menu item; and image generating means for generating a menu image on the basis of processing results of said controlling means and said selecting means;

wherein said selecting means decides upon said menu item displayed in the center of said menu image as said selected menu item said prescribed position corresponding to said center location of said menu image; and further wherein said selected menu item located at said center position of said menu image is highlighted.

2. The device of claim 1 wherein said image generating means generates said menu image in such a manner that said selected menu item becomes an image having a prescribed movement differing from other menu items.

3. The device of claim 1 wherein, when new information has been added to said menu item, said image generating means generates a menu image so that a prescribed object moves around the periphery of said menu item to which said new information has been added.

4. The device of claim 1 wherein said plurality of menu items have a hierarchical structure and an image expressing a transition between levels is also generated at the time of transitions between levels.

5. The device of claim 1, wherein the multi-dimensional space comprises three-dimensional space.

6. The device of claim 1, wherein the multi-dimensional space comprises two-dimensional space.

7. The device of claim 1, wherein the plurality of menu items define the bounds of the multi-dimensional space and wherein the image generating means generates the menu image from a perspective that lies within the multi-dimensional space.

8. The device of claim 7, wherein the plurality of menu items lie along a closed curve surface.

9. An image controlling method of controlling displaying of a menu image having a plurality of menu items arranged in an inner side of a multi-dimensional space having a cylindrical shape, comprising the steps of:

inputting an instruction from a user for selecting said plurality of menu items;

shifting said plurality of menu items within said multi-dimensional space in the same direction at the same velocity in response to said instruction from said user;

deciding upon one of the plurality of menu items at a prescribed position based on the shifting step such that when one of said menu items is shifted to said prescribed position, said menu item at said prescribed position is automatically determined as the selected menu item; and generating a menu image;

wherein said menu item displayed in the center of said menu image is decided upon as said selected menu item said prescribed position corresponding to the center location of said menu image, and further wherein said selected menu item located at said center position of said menu image is highlighted.

10. The method of claim 9 wherein said menu image is generated in such a manner that said selected menu item becomes an image having a prescribed movement differing from other menu items.

11. The method of claim 9 wherein, when new information has been added to said menu item, a menu image is generated so that a prescribed object moves around the periphery of said menu item to which said new information has been added.

12. The method of claim 9 wherein said plurality of menu items have a hierarchical structure and an image expressing a transition between levels is also generated at the time of transitions between levels.

13. The method of claim 9, wherein the plurality of menu items define the bounds of the multi-dimensional space and where in the menu image is generated from a perspective that lies within the multi-dimensional space.

14. The method of claim 9, wherein the plurality of menu items are arranged along a closed curve surface.

15. An image controlling device for controlling displaying of a menu image having a plurality of menu items arranged in an inner side of a multi-dimensional space having a cylindrical shape, comprising:

an input circuit configured to receive an instruction from a user for selecting said plurality of menu items;

a controller configured for carrying out a process for rotating a direction of a line of sight expressing the direction of said menu image displayed in response to a signal from said input means;

a selecting circuit configured for carrying out a process for deciding upon said menu item at a prescribed position within a visual field angle in the direction of said line of sight as a selected menu item such that when the visual field angle in the direction of the line of sight is rotated to the prescribed position, the menu item at the prescribed position is automatically determined as the selected menu item; and image generating means for generating a menu image on the basis of processing results of said controlling means and said selecting means;

wherein said menu item displayed in the center of said menu image is determined as said selected menu item, said prescribed position corresponding to the center location of said menu image; and further wherein said selected menu item located at said center position of said menu image is highlighted.

16. The device of claim 15, wherein the image generating means generates the image from a view point that lies within the plurality of menu items.

17. The device of claim 15, wherein the plurality of menu items are arranged along a closed curve surface.

18. An image controlling method of controlling displaying of a menu image having a plurality of menu items arranged in an inner side of a multi-dimensional space having a cylindrical shape, comprising the steps of:
inputting an instruction from a user for selecting one of said plurality of menu items;
rotating a direction of a line of sight expressing the direction of said plurality of menu images displayed in response to said instruction from said user;
deciding upon said menu item at a prescribed position within a visual field angle in the direction of said line of sight as a selected menu item such that when the visual field angle in the direction of the line of sight is rotated to the prescribed position, the menu item at the prescribed position is automatically determined as the selected menu item; and
generating a menu image;
wherein said prescribed position corresponds to a center location of said menu image; and further
wherein said selected menu item located at said center position of said menu image is highlighted.

19. The method of claim 18, wherein the step of generating the menu image comprises generating the menu image from a viewpoint that lies within the plurality of menu items.

20. The method of claim 19, wherein the plurality of menu items are arranged along a closed curve surface.

21. An image controlling device for controlling displaying of a menu image having a plurality of menu items arranged in an inner side of a multi-dimensional space having a cylindrical shape, comprising:
input means for inputting an instruction from a user for selecting said plurality of menu items;
controlling means for calculating shifting velocity from prescribed parameters in response to a signal from said input means, shifting said menu items in said cylindrical multi-dimensional space at said shifting velocity such that one of said menu items is positioned at a prescribed position, and generating multi-dimensional space information, wherein said prescribed parameters include at least acceleration, and further wherein the menu item at the prescribed position is automatically determined as a selected menu item; and
image generating means for generating said menu image on the basis of said multi-dimensional information generated by said controlling means;
wherein said prescribed position corresponds to a center location of said menu image; and further
wherein said selected menu item located at said center position of said menu image is highlighted.

22. The device of claim 21, wherein the image generating means generates the image from a viewpoint that lies within the plurality of menu items.

23. The device of claim 22, wherein the plurality of menu items are arranged along a closed curve surface.

24. An image controlling method of controlling displaying of a menu image having a plurality of menu items arranged in an inner side of a multi-dimensional space having a cylindrical shape, comprising the steps of:
inputting an instruction from a user for selecting said plurality of menu items;
calculating shifting velocity from prescribed parameters in response to said instruction from said user, shifting said menu items in multi-dimensional space at said shifting velocity such that one of said menu items is positioned at a prescribed position, and generating multi-dimensional space information, wherein said prescribed parameters include at least acceleration, and further wherein the menu item at the prescribed position is automatically determined as a selected menu item; and
generating said menu image on the basis of said multi-dimensional information;
wherein said prescribed position corresponds to a center location of said menu image; and further
wherein said selected menu item located at said center position of said menu image is highlighted.

25. The device of claim 24, wherein the step of generating the menu image comprises generating the menu image from a viewpoint that lies within the plurality of menu items.

26. The device of claim 25, wherein the plurality of menu items are arranged along a closed curve surface.

27. An image controlling device for controlling displaying of a menu image having a plurality of menu items arranged in an inner side of a multi-dimensional space having a cylindrical shape, comprising:
input means for inputting an instruction from a user for selecting said plurality of menu items;
controlling means for calculating a shifting velocity from prescribed parameters in response to a signal from said input means and rotating at said shifting velocity a direction of a line of sight expressing the direction of a menu image to be displayed such that one of said menu items is positioned at a prescribed position, wherein said prescribed parameters include acceleration, and further wherein the menu item at the prescribed position is automatically determined as a selected menu item; and
image generating means for generating said menu image on the basis of said direction of said line of sight;
wherein said prescribed position corresponds to a center location of said menu image; and further
wherein said selected menu item located at said center position of said menu image is highlighted.

28. The device of claim 27, wherein a vertex of the line of sight lies within the plurality of menu items.

29. The device of claim 28, wherein the plurality of menu items define a closed curve surface.

30. An image controlling method of controlling displaying of a menu image having a plurality of menu items arranged in an inner side of a multi-dimensional space having a cylindrical shape, comprising the steps of:
inputting an instruction from a user for selecting said plurality of menu items;
calculating a shifting velocity from prescribed parameters in response to said instruction from said user and rotating at said shifting velocity a direction of a line of sight expressing the direction of a menu image to be displayed such that one of said menu items is positioned at a prescribed position, wherein said prescribed parameters include acceleration, and further wherein the menu item at the prescribed position is automatically determined as a selected menu item; and generating said menu image on the basis of said direction of said line of sight;
wherein said prescribed position corresponds to a center location of said menu image; and further
wherein said selected menu item located at said center position of said menu image is highlighted.

31. The method of claim 30, wherein a vertex of the line of sight lies within the plurality of menu items.

32. The method of claim 31, wherein the plurality of menu items define a closed curve surface.

33. A recordable medium having instructions directing the operation of a computer recorded thereon, wherein the instructions are operative to control the display of a menu image having a plurality of menu items arranged in an inner side of a multi-dimensional space having a cylindrical shape, comprising:
instructions directing the computer to input an instruction from a user for selecting said plurality of menu items;
instructions directing the computer to carry out a process for shifting said plurality of menu items within said multi-dimensional space in the same direction at the same velocity in response to the instruction from a user;
instructions directing the computer to carry out a process for deciding upon one of said menu items at a prescribed position based on the instructions directing the computer to carry out the shifting process such that when one of said menu items is shifted to said prescribed position, said menu item at said prescribed position is automatically determined as the selected menu item; and
instructions directing the computer to generate a menu image on the basis of the processing results of the process for shifting and the process for deciding;
wherein the instructions directing the computer to carry out a process for deciding further direct the computer to decide upon said menu item displayed in the center of said menu image as said selected menu item, said prescribed position corresponding to said center of said menu image; and further
wherein said selected menu item located at said center position of said menu image is highlighted.

34. The medium of claim 33 wherein the instructions directing the computer to generate a menu image further direct the computer to generate said menu image in such a manner that said selected menu item becomes an image having a prescribed movement differing from other menu items.

35. The medium of claim 33 wherein, when new information has been added to said menu item, the instructions directing the computer to generate a menu image further direct the computer to generate a menu image so that a prescribed object moves around the periphery of said menu item to which said new information has been added.

36. The medium of claim 33 wherein said plurality of menu items have a hierarchical structure and wherein the recordable medium further comprises instructions directing the computer to generate an image expressing a transition between levels at the time of transitions between levels.

37. The medium of claim 33, wherein the instructions directing the computer to generate the menu image further comprise instructions directing the computer to generate the menu image from a perspective that lies within the plurality of menu items.

38. The medium of claim 37, wherein the instructions directing the computer to generate the menu image further comprise instructions directing the computer to arrange the plurality of menu items along a closed curve surface.

39. A recordable medium containing instructions directing the operation of a computer, wherein the instructions control the display of a menu image having a plurality of menu items arranged in an inner side of a multi-dimensional space having a cylindrical shape, comprising:
instructions directing the computer to receive an instruction from a user for selecting said plurality of menu items;
instructions directing the computer to shift said plurality of menu items within said multi-dimensional space in the same direction at the same velocity in response to said instruction from said user;
instructions directing the computer to decide upon one of the plurality of menu items at a prescribed position based on the instructions directing the computer to shift such that when one of said menu items is shifted to said prescribed position, said menu item at said prescribed position is automatically determined as the selected menu item; and
instructions directing the computer to generate a menu image;
wherein the instructions directing the computer to decide further direct the computer to decide upon a menu item displayed in the center of said menu image as said selected menu item, said prescribed position corresponding to said center of said menu image; and further
wherein said selected menu item located at said center position of said menu image is highlighted.

40. The medium of claim 39 wherein the instructions directing the computer to generate the menu image further direct the computer to generate said menu image in such a manner that said selected menu item becomes an image having a prescribed movement differing from other menu items.

41. The medium of claim 39 wherein, when new information has been added to said menu item, the instructions directing the computer to generate the menu image further direct the computer to generate the menu image so that a prescribed object moves around the periphery of said menu item to which said new information has been added.

42. The medium of claim 39, wherein said plurality of menu items have a hierarchical structure and wherein the recordable medium further comprises instructions directing the computer to generate an image expressing a transition between levels at the time of transitions between levels.

43. The medium of claim 39, wherein the instructions directing the computer to generate the menu image further comprise instructions directing the computer to generate the menu image from a perspective that lies within the plurality of menu items.

44. The medium of claim 43, wherein the instructions directing the computer to generate the menu image further comprise instructions directing the computer to arrange the plurality of menu items along a closed curve surface.

45. A recordable medium containing instructions directing the operation of a computer, wherein the instructions control the display of a menu image having a plurality of menu items arranged in an inner side of a multi-dimensional space having a cylindrical shape, comprising:
instructions directing the computer to receive an instruction from a user for selecting said plurality of menu items;
instructions directing the computer to rotate a direction of a line of sight expressing the direction of said menu image displayed in response to said instruction from said user;

instructions directing the computer to decide upon said menu item at a prescribed position within a visual field angle in the direction of said line of sight as a selected menu item such that when the visual field angle in the direction of the line of sight is rotated to the prescribed position, the menu item at the prescribed position is automatically determined as the selected menu item; and instructions directing the computer to generate a menu image;

wherein said prescribed position corresponds to a center location of said menu image; and further wherein said selected menu item located at said center position of said menu image is highlighted.

46. The medium of claim 45, wherein the instructions directing the computer to generate the menu image further comprise instructions directing the computer to generate the menu image from a perspective that lies within the plurality of menu items.

47. The medium of claim 46, wherein the instructions directing the computer to generate the menu image further comprise instructions directing the computer to arrange the plurality of menu items along a closed curve surface.

48. A recordable medium containing instructions directing the operation of a computer, wherein the instructions control the display of a menu image having a plurality of menu items arranged in an inner side of a multi-dimensional space having a cylindrical shape, comprising:

instructions directing the computer to receive an instruction from a user for selecting said plurality of menu items;

instructions directing the computer to calculate a shifting velocity from prescribed parameters in response to a signal from an input means, to shift said menu items in multi-dimensional space at said shifting velocity such that one of said menu items is positioned at a prescribed position, and to generate multi-dimensional space information, wherein said prescribed parameters include at least acceleration, and further wherein the menu item at the prescribed position is automatically determined as a selected menu item; and instructions directing the computer to generate said menu image on the basis of said multi-dimensional information;

wherein said prescribed position corresponds to a center location of said menu image; and further wherein said selected menu item located at said center position of said menu image is highlighted.

49. The medium of claim 48, wherein the instructions directing the computer to generate the menu image further comprise instructions directing the computer to generate the menu image from a perspective that lies within the plurality of menu items.

50. The medium of claim 49, wherein the instructions directing the computer to generate the menu image further comprise instructions directing the computer to arrange the plurality of menu items along a closed curve surface.

51. A recordable medium containing instructions directing the operation of a computer, wherein the instructions control the display of a menu image having a plurality of menu items arranged in an inner side of a multi-dimensional space having a cylindrical shape, comprising:

instructions directing the computer to receive an instruction from a user for selecting said plurality of menu items;

instructions directing the computer to calculate a shifting velocity from prescribed parameters in response to the instruction from the user and to rotate, at said shifting velocity, a direction of a line of sight expressing the direction of a menu image to be displayed such that one of said menu items is positioned at a prescribed position, wherein said prescribed parameters include at least acceleration, and further wherein the menu item at the prescribed position is automatically determined as a selected menu item; and instructions directing the computer to generate said menu image on the basis of said direction of said line of sight;

wherein said prescribed position corresponds to a center location of said menu image; and further wherein said selected menu item located at said center position of said menu image is highlighted.

52. The medium of claim 51, wherein the instructions directing the computer to generate the menu image further comprise instructions directing the computer to generate the menu image from a perspective that lies within the plurality of menu items.

53. The medium of claim 52, wherein the instructions directing the computer to generate the menu image further comprise instructions directing the computer to arrange the plurality of menu items along a closed curve surface.

* * * * *

UNITED STATES PATENT AND TRADEMARK OFFICE
CERTIFICATE OF CORRECTION

PATENT NO.    : 6,184,884 B1
DATED         : February 6, 2001
INVENTOR(S)   : Junichi Nagahara et al.

It is certified that error appears in the above-identified patent and that said Letters Patent is hereby corrected as shown below:

Column 1,
Line 47, change "planer" to -- planar --.

Column 5,
Line 23, delete "." (first occurrence).

Column 6,
Line 48, change "peoples" to -- people's --.

Column 7,
Line 66, change "of" to -- in -- and change "in" to -- of --.

Column 9,
Line 29, change "Si" to -- S1 --.

Column 12,
Line 44, change "9" to -- 13 --.

Signed and Sealed this

Ninth Day of April, 2002

Attest:

JAMES E. ROGAN
Director of the United States Patent and Trademark Office

Attesting Officer